Aug. 9, 1966   A. G. BOSE   3,265,870
SIGNAL TRANSLATION
Filed Nov. 16, 1956   13 Sheets-Sheet 1
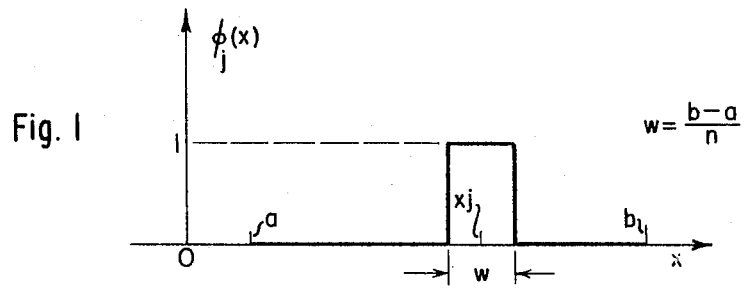
Fig. 1   $w = \dfrac{b-a}{n}$
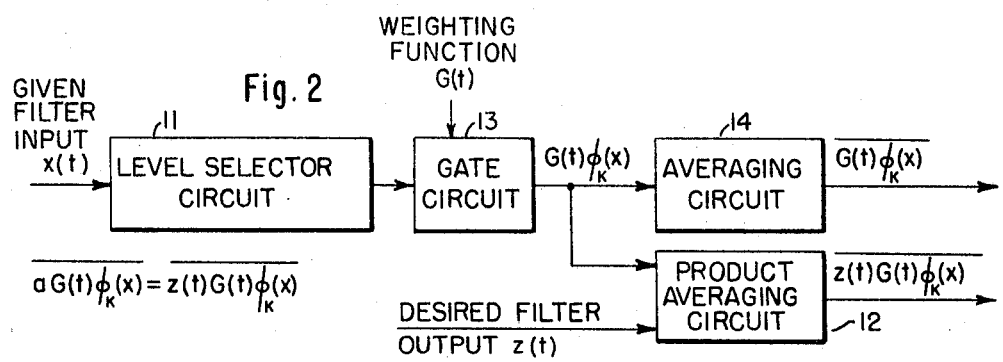
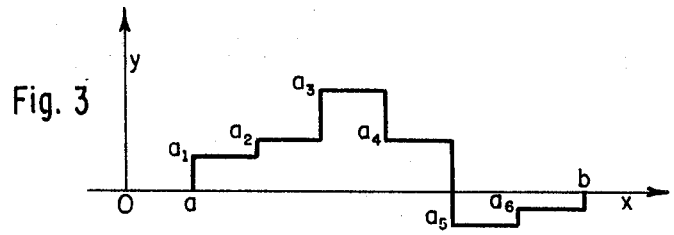
Fig. 3
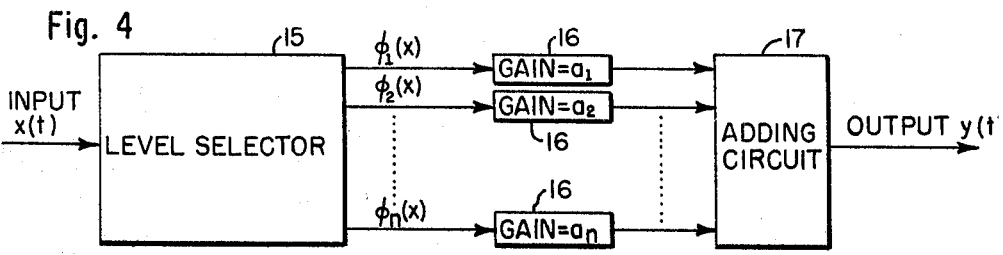
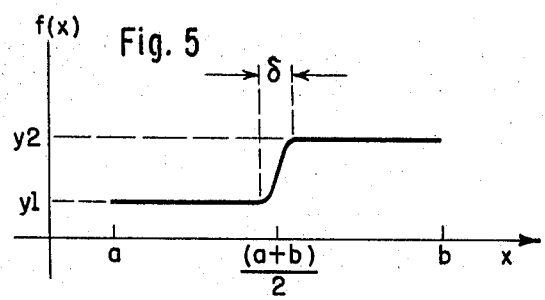
INVENTOR.
Amar Gopal Bose
BY KENWAY, JENNEY, WITTER & HILDRETH Aug. 9, 1966   A. G. BOSE   3,265,870
SIGNAL TRANSLATION
Filed Nov. 16, 1956                                    13 Sheets-Sheet 4

$$A_a G(t) \Phi(a) = \overline{z(t) G(t) \Phi(a)}$$

INVENTOR.
Amar Gopal Bose
BY
KENWAY, JENNEY, WITTER & HILDRETH

Aug. 9, 1966  A. G. BOSE  3,265,870

SIGNAL TRANSLATION

Filed Nov. 16, 1956  13 Sheets-Sheet 5

INVENTOR.
Amar Gopal Bose
BY
KENWAY, JENNEY, WITTER & HILDRETH $$\overline{A_a G(t) \Phi(a)} = \overline{z(t)G(t)\Phi(a)}$$

Aug. 9, 1966 A. G. BOSE 3,265,870
SIGNAL TRANSLATION
Filed Nov. 16, 1956 13 Sheets-Sheet 7
Fig. 16
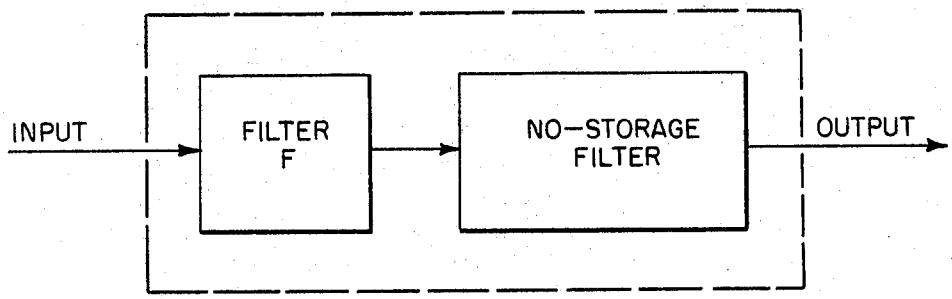
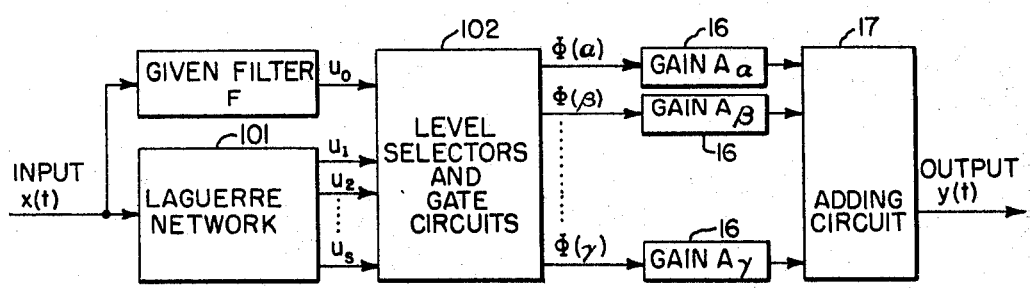
Fig. 17
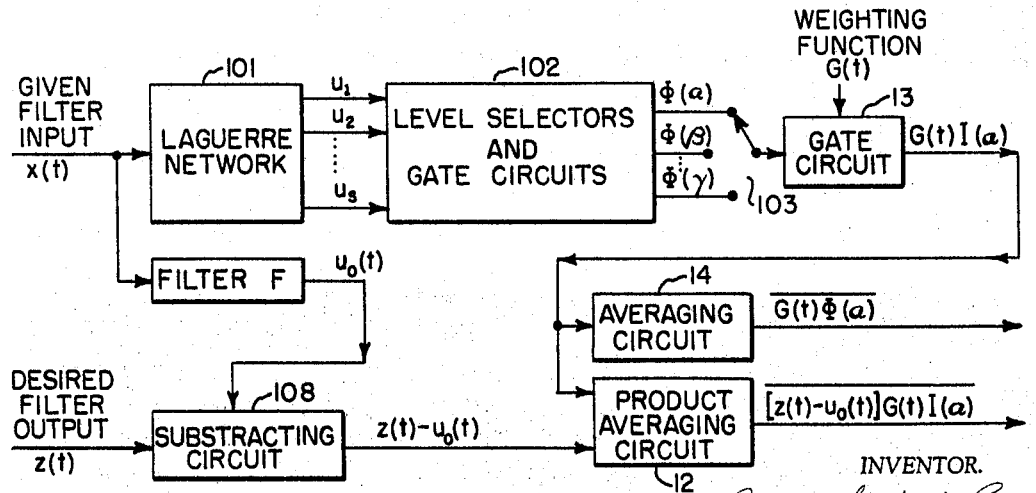
$$\overline{A_\alpha G(t)\Phi(\alpha)} = \overline{[z(t)-u_0(t)]\,G(t)\Phi(\alpha)}$$
Fig. 18
INVENTOR.
Amar Gopal Bose
BY
KENWAY, JENNEY, WITTER & HILDRETH Aug. 9, 1966  A. G. BOSE  3,265,870
SIGNAL TRANSLATION
Filed Nov. 16, 1956  13 Sheets-Sheet 8

INVENTOR.
Amar Gopal Bose
BY
KENWAY, JENNEY, WITTER & HILDRETH

Aug. 9, 1966
A. G. BOSE
3,265,870
SIGNAL TRANSLATION
Filed Nov. 16, 1956
13 Sheets-Sheet 11
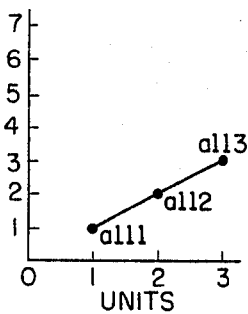
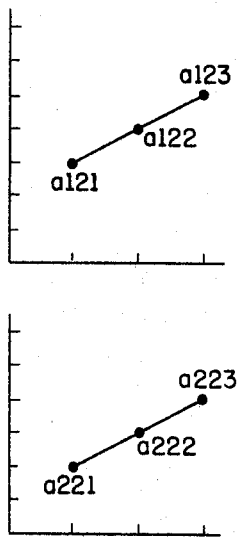
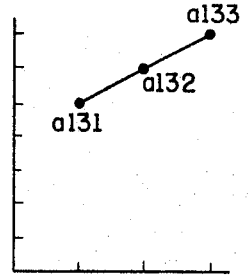
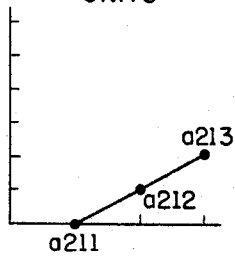
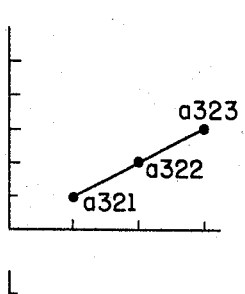
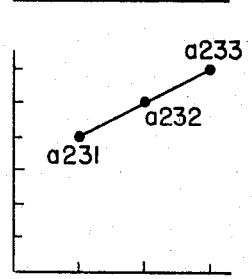
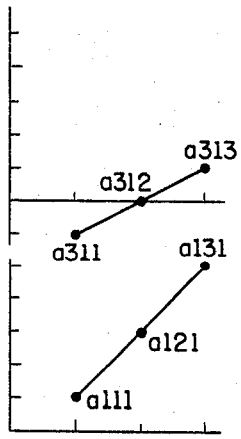
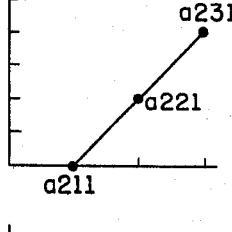
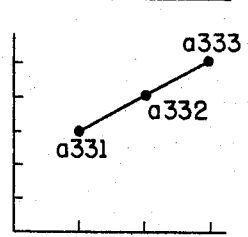
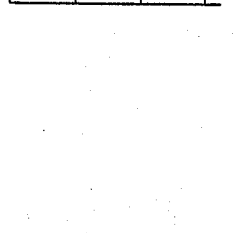
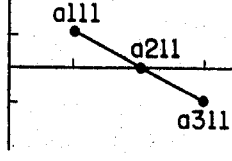
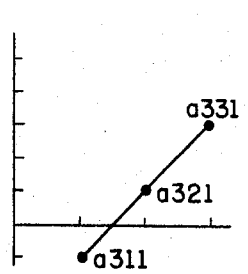
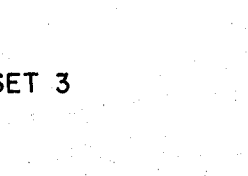
Fig. 24
INVENTOR.
Amar Gopal Bose
BY KENWAY, JENNEY, WITTER & HILDRETH Aug. 9, 1966   A. G. BOSE   3,265,870
SIGNAL TRANSLATION
Filed Nov. 16, 1956   13 Sheets-Sheet 12

INVENTOR.
Amar Gopal Bose
BY KENWAY, JENNEY, WITTER & HILDRETH

Aug. 9, 1966

A. G. BOSE 3,265,870

SIGNAL TRANSLATION

Filed Nov. 16, 1956

INVENTOR.
Amar Gopal Bose
BY KENWAY, JENNEY, WITTER & HILDRETH

United States Patent Office 3,265,870
Patented August 9, 1966

3,265,870
SIGNAL TRANSLATION
Amar Gopal Bose, Philadelphia, Pa. (M.I.T. Department of Electrical Engineering, Cambridge, Mass. 02139)
Filed Nov. 16, 1956, Ser. No. 622,685
42 Claims. (Cl. 235—150)

The present invention relates in general to signal translation and more particularly to optimum filters and predictors and apparatus and methods useful in their determination. Utilization of the novel design methods and apparatus facilitates the determination of an optimum filter for selectively providing a desired signal included in an input signal according to a flexible criterion which the designer is free to choose. The filter thus determined may be synthesized in the form of a nonlinear system without storage, cascaded with a linear filter which may have storage. According to other aspects of the invention, means are provided for determining apparatus capable of optimum multiple nonlinear prediction. Stated in other words, such apparatus is capable of responding to a plurality of input signals and their past to provide an output signal indicative of an event related to the combination of data represented by the input signals, and most likely to occur at a predetermined time in the future. Such apparatus is especially useful in the prediction of weather.

Basically, a nonlinear system may be defined as a system wherein the output signal may be represented by a series expansion of the input signal which includes at least one term involving the product of the input signal or one of its derivatives or integrals, with the input signal or one of its derivatives or integrals. Stated in negative terms, the relation between output and input is not expressible as a linear differential equation.

The design of optimum linear filters and predictors according to a mean square error criterion is well-known in the art and has great utility in a number of applications. However, the deviation of the actual response of an optimally designed linear system from the desired response may be excessive in many applications. While the increased flexibility of nonlinear systems would seem to offer opportunities for lessening this deviation, synthesis of optimum nonlinear systems has not been forthcoming because of the absence of a practical general method for characterizing such systems for any input.

A physically realizable nonlinear system, like a linear one, is a system whose present output is a function of the past of its input. The system may be regarded as a computer that operates on the past of one time function to yield the present value of another time function. Mathematically stated, the system performs a transformation on the past of its input to yield its present output. When this transformation is linear (the case of linear systems) the familiar convolution integral may be utilized to obtain the present output from the past of the input and the system is said to be characterized by its response to an impulse. That is, the response of a linear system to an impulse is sufficient to determine its response to any input. When the transformation is nonlinear there is no longer a simple relation like the convolution integral relating the output to the past of the input and the system can no longer be characterized by its response to an impulse since superposition does not apply. Wiener has shown a nonlinear system can be characterized by a set of coefficients and that these coefficients can be determined from a knowledge of the response of the system to shot noise excitation. Thus, according to the method of Wiener, shot noise occupies the same position as a probe for investigating nonlinear systems that the impulse occupies as a probe for investigating linear systems. Theoretical aspects of the Wiener theory of nonlinear system characterization are fully discussed in the thesis of Amar G. Bose submitted in partial fulfillment of the requirements for the degree of Doctor of Science at the Massachusetts Institute of Technology in June 1956 entitled A Theory of Nonlinear Systems, reproduced in M.I.T. Research Laboratory of Electronics Technical Report No. 309 portions of which are reproduced below.

The objectives of Wiener's method are: to obtain a set of coefficients which characterize a time-invariant nonlinear system, and to prevent a procedure for synthesizing the system from a knowledge of its characterizing coefficients. An operator relating the output to the past of the input of a nonlinear system is defined in such a way that the characterizing coefficients can be evaluated experimentally.

The method is confined to those nonlinear systems whose present behavior depends less and less upon the remote past of the input as this past is pushed back in time. More precisely, attention is restricted to those systems whose present output is influenced to an arbitrarily small extent by that portion of the past of the input beyond some arbitrarily large but finite time. Further, the theory is restricted to those nonlinear systems that operate on continuous time functions to yield continuous time functions. This is clearly no physical restriction since physical time functions, though they may change very rapidly, are continuous. The reasons for these restrictions will become apparent in the development of the theory that follows.

According to Wiener the most general probe for the investigation of nonlinear systems is Gaussian noise with a flat power density spectrum because there is a finite probability that this noise will, at some time, approximate any given time function arbitrarily closely over any finite time interval. Gaussian noise with a flat power density spectrum can be approximated by the output of a shot noise generator. Hence, if two systems have the same response to shot noise they will have the same response for any input and the systems are said to be substantially equivalent. The Wiener theory of nonlinear system classification is based on this property of the shot noise probe. A given system is characterized by exciting it with shot noise and measuring certain averages of products of its output with functions of the shot noise input which can be generated in the laboratory. The measured quantities are numerically equal to the coefficients in the Wiener nonlinear operator. Once these coefficients are determined a system can be synthesized that yields the same response to shot noise as does the given system. Hence the two systems are equivalent.

Recognizing that the present output of a nonlinear system is a function of the past of its input, Wiener formulated his nonlinear operator by first characterizing the past of the time function on which it operates by a set or coefficients and then expressing the result of the operation (the system output) as an expansion of these coefficients. In the development which follows these problems are separately considered; first, the problem of characterizing the past of a time function by a set of coefficients, and then the problem of expressing a nonlinear function of these coefficients.

To simplify the description of the method, it is convenient at this point to define certain quantities and relations.

(A) The $n$th Laguerre polynominal is defined as $$L_n(x) = \frac{1}{(n-1)!} e^x \frac{d^{(n-1)}}{dx^{(n-1)}}(x^{(n-1)} e^{-x}) \qquad n=1, 2, \ldots$$

(B) The normalized Laguerre functions $h_n(x)$ are defined as $$h_n(x) = \begin{cases} e^{-x/2} L_n(x) & x \geq 0 \\ 0 & x < 0 \end{cases} \quad (1)$$

The following orthogonality relation exists for these functions:

$$\int_0^\infty h_m(x) h_n(x) dx = \begin{cases} 1 \text{ if } m=n \\ 0 \text{ if } m \neq n \end{cases} \quad (2)$$

(C) The $n$th Hermite polynomial is defined as $$F_n(x) = (-1)^{(n-1)} e^{x^2} \left(\frac{d}{dx}\right)^{(n-1)} e^{-x^2} \quad n=1, 2, 3, \ldots$$

(D) The normalized Hermite polynomials $\eta_n(x)$ are defined as $$\eta_n(x) = \frac{F_n(x)}{[2^{(n-1)}(n-1)!(\pi)^{1/2}]^{1/2}} \quad (3)$$

(E) The normalized Hermite functions are defined $$\psi_n(x) = e^{-x^2/2} \eta_n(x) \quad (4)$$

These functions form a normal orthogonal set over the interval $-\infty$ to $\infty$. Consequently, $$\int_{-\infty}^\infty \eta_m(x) \eta_n(x) e^{-x^2} dx = \begin{cases} 1 & m=n \\ 0 & m \neq n \end{cases} \quad (5)$$

Given a time function $x(t)$, an object is to determine a set of coefficients which characterize its past. The coefficients are said to characterize the past of $x(t)$ if this past can be constructed from a knowledge of them. Attention will be confined to real time functions $x(t)$ having the property $$\int_{-\infty}^\infty x^2(t) dt < \infty$$

The past of such time functions can be expanded in a complete set of orthogonal functions. Further, from a knowledge of the coefficients of this expansion the time function may be constructed almost everywhere as indicated in a book by Norbert Wiener entitled The Fourier Integral and Certain of Its Applications, published in 1933 by Dover Publications, Inc. Because of their realization as the impulse response of rather simple networks, Wiener chose to expand the past of $x(t)$ in terms of Laguerret functions. These functions form a complete set over the interval 0 to $\infty$ and have the orthogonality property indicated in Eq. 2. The expansion of the past of $x(t)$ in terms of the Laguerre functions is $$x(-t) = \sum_{n=1}^\infty u_n h_n(t) \quad t \geq 0 \quad (6)$$

where the present time is $t=0$ and the $u_n$ are the Laguerre coefficients of the past of $x(t)$. Taking advantage of the orthogonality property of Eq. 2 the following expression is obtained for the $u_n$.

$$u_n = \int_0^\infty x(-t) h_n(t) dt \quad (7)$$

These Laguerre coefficients are readily generated in practice as the outputs of a rather simple network whose input is $x(t)$. This network is called a Laguerre network. It is a constant impedance lossless ladder structure terminated in its characteristic impedance and preceded by a series inductance. For a detailed description of Laguerre networks, their analysis and synthesis, reference is made to a paper of Y. W. Lee entitled Synthesis of Electric Networks By Means of the Fourier Transforms of Laguerre's Functions in the "Journal of Mathematics and Physics" for June 1932, pp. 83–113. It is sufficient here to know that the impulse response of the Laguerre network at the $n$th output terminal pair on open circuit is $h_n(t)$ for $n=1, 2, 3, \ldots$. It will now be shown that if $x(t)$ is applied to the input of this network, the output at the $n$th terminal pair at time $t=0$ is the $n$th Laguerre coefficient $u_n$ of the past of $x(t)$ up to the time $t=0$. The network input is $x(t)$. The output $r_n(t)$ at the $n$th terminal pair is given by the convolution of $x(t)$ with $h_n(t)$. That is, $$r_n(t) = \int_0^\infty x(t-\tau) h_n(\tau) d\tau$$

At time $t=0$ the output is $$r_n(0) = \int_0^\infty x(-\tau) h_n(\tau) d\tau \quad (8)$$

But the right side of this equation is seen to be equivalent to the expression for $u_n$ given in Eq. 7. Hence, if $x(t)$ is applied to the input of a Laguerre network, the output of the $n$th terminal pair at time $t=0$ is equal to the $n$th Laguerre coefficient of the past of $x(t)$ up to the time $t=0$. In general, the output of the $n$th terminal pair of the Laguerre network at any time $t$ is equal to the $n$th Laguerre coefficient of the past of the input up to the time $t$.

Since the probe for the investigation of nonlinear systems in the Wiener theory is shot noise it will be necessary in developing this theory to make use of several properties of the Laguerre coefficients of a shot noise process.

When the input to a Laguerre network is shot noise the outputs (the Laguerre coefficients of the past of the shot noise input) have the following three properties of interest:

(1) They are Gaussianly distributed.
(2) They are statistically independent.
(3) They all have the same variance.

The first property follows from the well-known result that the response of a linear system to a Gaussian input is Gaussian (recall that shot noise is a Gaussian time function with a flat power density spectrum). The second property is proved in the aforementioned thesis.

Property 3 can be proved by solving for the variance of the $n$th Laguerre coefficient in terms of the power density spectrum of the $n$th output of the network. However it can be seen very simply by recalling that the Laguerre network, except for its first series inductance, is a constant resistance lossless structure terminated in its characteristic resistance. If the network is arranged with the input terminal pair at the left, looking to the right at any of the output terminal pairs $n-n$, the characteristic resistance of the network is seen. Since the structure is lossless, the same power flows through each section, and since the impedance at each section is resistive and the same for each section, the mean square value of every Laguerre coefficient is the same. For shot noise input the mean value of each coefficient is zero. Hence the variance $$\sigma_n^2 = \overline{u_n^2(t)} - \overline{u_n(t)}^2$$

is the same for all Laguerre coefficients. In particular if the level of the shot noise input to the network is properly adjusted, all the Laguerre coefficients will have $\sigma^2 = 1$. In the development of the Wiener theory which follows, it is convenient to assume this to be the case.

Any practical application of the Wiener theory must of course use only a finite number of Laguerre coefficients to characterize the past of the system input. Since all the Laguerre functions decay exponentially Eq. 1, for any finite number of these functions there exists some time in the finite past such that the present outputs of the Laguerre network are influenced to an arbitrarily small extent by the behavior of the input prior to this time. That is, for all practical purposes the outputs of the Laguerre network are not cognizant of the past of the input beyond some finite time. Hence, as mentioned above the application of the Wiener theory is restricted to systems whose present output is influenced to an arbitrarily small extent by that portion of the past of the input beyond some arbitrarily large but finite time.

Since the Laguerre coefficients characterize the past of a time function, any quantity dependent only on the past of this time function can be expressed as a function of these coefficients. Thus for the nonlinear system with input $x(t)$ and output $y(t)$ $$y(t) = F[u_1, u_2, \ldots, u_s, \ldots] \quad (9)$$

in which the $u$'s are the Laguerre coefficients of $x(t)$ at time $t$.

To put Eq. 9 in a more useful form, an expansion is chosen for the function F of the Laguerre coefficients. These coefficients can take on any real value from $-\infty$ to $\infty$. The Hermite functions are chosen for the expansion because they form a complete orthonormal set over the interval $-\infty$ to $\infty$ and are particularly adapted to a Gaussian distribution. The expansion of Eq. 9 in terms of normalized Hermite functions which are defined in Eq. 4 reads $$y(t) = \lim_{s \to \infty} \sum_{i=1}^{\infty} \sum_{j=1}^{\infty} \cdots \sum_{h=1}^{\infty} a_{i,j,\ldots,h} \eta_i(u_1) \eta_j(u_2) \cdots \eta_h(u_s) e^{-\frac{(u_1^2 + u_2^2 + \ldots + u_s^2)}{2}} \quad (10)$$

This equation expresses the amplitude of the time function $y(t)$ as a function of the Laguerre coefficients of the past of the time function $x(t)$. It can be simplified by letting $V(\alpha)$ represent the product of polynomials $\eta_i(u_1) \eta_j(u_2) \ldots \eta_h(u_s)$ and $A_\alpha$ represent the corresponding coefficient $a_{i,j,\ldots,h}$. Then Eq. 10 becomes $$y(t) = \lim_{s \to \infty} \sum_\alpha A_\alpha V(\alpha) e^{-\frac{u_1^2 + u_2^2 + \ldots + u_s^2}{2}} \quad (11)$$

The behavior of any system of the class of systems considered in the Wiener theory can be expressed in the form of Eq. 11. The coefficients $A_\alpha$ are said to characterize the system because the complete expression relating the output of the system $y(t)$ to the past of its input $x(t)$, for any input time function, is known when the $A_\alpha$'s are known.

To obtain an expression for the $A_\alpha$'s suitable for experimental evaluation, Wiener multiplies both sides of (11) by $V(\beta)$ and then makes use of the Gaussian distribution of the Laguerre coefficients of a shot noise process to obtain the equation.

It can be shown that $$(2)^{s/2} \overline{y(t) V(\beta)} = A_\beta \quad (12)$$

thus providing the basis for the experimental determination of the characterizing coefficients $A_\alpha$.

For any given number of Laguerre coefficients and Hermite functions, the Wiener theory determines that system whose output best approximates (in the weighted mean square sense) the output of the given system for shot noise input to both systems. As the number of Laguerre coefficients and Hermite functions is increased, the output (for shot noise input) of any system of the Wiener class can be approximated with vanishing error. And, if two systems have the same response to shot noise, then they have the same response to any common input and can be considered to be equivalent.

Equation 12 provides the basis for the experimental determination of the characterizing coefficients $A_\alpha$. The output of a shot noise generator is fed simultaneously into the given nonlinear system and into the Laguerre network. The output of the given nonlinear system is $y(t)$. The outputs of the Laguerre network are fed into a device involving multipliers and adders. This device generates products of Hermite polynomials (the V's) whose arguments are the Laguerre coefficients. Each output of this Hermite polynomial generator, when multiplied by $y(t)$ and averaged, yields, by Eq. 12, one of the characterizing coefficients of the given nonlinear system.

Having described the method for determining the characterizing coefficients of a nonlinear system, it is appropriate to consider the Wiener method of synthesis of nonlinear systems from their characterizing coefficients. The general representation of a nonlinear system is given by Eq. 11 which is the guide for the synthesis problem. This equation indicates that, for each $\alpha$, there must be generated $V(\alpha)$ and multiply it by $A_\alpha$ and the exponential exp $$-(u_1^2 + \ldots + u_s^2)/2$$

Then each product must be added to give the system output $y(t)$. In practice, the number of multipliers is reduced if the sum of the products $A_\alpha V(\alpha)$ is first formed and then multiplied by the exponential function.

The exponential function, exp $$-(u_1^2 + \ldots + u_s^2)/2$$

can be obtained as the product of $s$ exponential function generators whose inputs are respectively $u_1$ through $u_s$. Such generators give an output of exp $(-u^2/2)$ when the input is $u$. They are realizable, among other ways, in the form of a small cathode-ray tube with a special target to generate the exp $(-u^2/2)$ function.

It can be seen from Eq. 10 that if the past of the system input is represented by $s$ Laguerre coefficients and if, furthermore, the Hermite polynomial indices, $i, j, \ldots, h$ (Eq. 10), range from 1 to $n$, there are $n^s$ coefficients $A_\alpha$ to evaluate. This number can become quite large in many cases of practical interest. At present, the large number of multipliers that are required for the generation of the Hermite polynomials and their products is a principal deterrent to the practical application of the Wiener method of characterization and synthesis. Accordingly, at present, the Wiener theory is of greater theoretical than practical interest.

One of the most significant contributions of the Wiener theory is that it shows that any nonlinear system, of the broad class of systems considered by this theory, can be synthesized as a linear network with multiple outputs cascaded with a nonlinear circuit that has no memory of the past. The linear network (the Laguerre network) serves to characterize the past of the input and the nonlinear no-storage circuit performs a nonlinear operation on the present outputs of the linear network to yield the system output. Thus, regardless of how the linear and nonlinear operations occur in any given circuit the same over-all operation can be achieved by a linear operation followed by a nonlinear one.

Since linear systems form such an important class of systems in engineering, it is desirable that a nonlinear theory handle linear and nearly linear systems. Although the Wiener theory includes within its scope linear as well as nonlinear systems it is not particularly suited for application to the former. The reason for this can be seen by considering the form of the general Wiener system. The exponential function generator bypasses the Hermite polynomial generator. In order for such a system to represent a linear system, the operation from the output of the Laguerre network to the output of the system must be linear. This means that the gain coefficients $A_\alpha$ must have values which cause cancellation of the output of the exponential function generator and give the desired linear operation on the Laguerre coefficients. To achieve this cancellation effect will in general require a very large number of Hermite functions and even then there is the unfavorable situation of obtaining a desired output that may be the small difference of two large quantities.

Considering time-invariant nonlinear systems that operate on statistically stationary time functions, the filter problem is one of determining that system, of a class of systems, that operates on the past of a given input time function $x(t)$ to yield an output $y(t)$ that best approximates a given desired output $z(t)$ with respect to some error criterion. When the optimum filter is chosen from the class of linear systems and when the mean square error criterion is adopted, Wiener has shown that this optimum filter is determined by the autocorrelation function of the input time function and the crosscorrelation function of the input with the desired output. Since these correlation functions determine the optimum mean-square linear filter, the same linear filter is optimum for all time functions having these same correlation functions in spite of the fact that other statistical parameters of these time functions may be very different. It is in the search for better filters that attention is directed to nonlinear filters which make use of more statistical data than just first order correlation functions.

In the prior art, there have been two distinct modes of approach to the optimum nonlinear filter problem. One approach parallels the approach of Wiener to linear systems by choosing the form or class of filters and then finding the optimum member of this class by minimizing the mean square error between the desired output and the actual system output. The other approach formulates an appropriate statistical criterion and then determines the optimum filter for this criterion with little or no restrictions placed upon the form of the filter. Both these approaches yield equations for optimum filters in terms of higher order statistics (higher order distribution functions or correlation functions) of the input and desired output. In applying these approaches two problems are presented. First, the necessary statistical data about the input and desired output must be obtained, and then the design equations, which usually are quite complex, must be solved for the optimum filter in terms of this data. In nonlinear filter problems the amount of statistical data required in the design of the filter usually far exceeds that which is available, and it is necessary to make certain simplifying assumptions or models of the signal and noise processes in order to calculate the required distributions.

The present invention contemplates and has as a primary object the provision of a method for characterizing nonlinear systems in a manner which facilitates the experimental determination of apparatus which responds to an input signal having desired and unwanted signal components by providing an output signal which includes substantially only the desired signal. Another broad class of apparatus sought to be determined experimentally includes apparatus which responds to one or more input signals by providing an output signal characteristic of a value of one of the input signals at a predetermined future time or of a future event related to data represented by the input signals.

An object of the invention is the provision of a method and apparatus for experimentally determining the optimum filter for selecting a desired signal, which may be random, from an input signal which also includes unwanted signal components, even though the latter components may also be random signals. Ancillary to this object is the provision of the filter thus determined.

A further object of the invention is the provision of a method and apparatus for experimentally determining the predictor which most accurately forecasts a situation at a selected time in the future in response to signals representative of related events whose past history is known. Ancillary to this object is the provision of the optimum multiple predictor thus determined.

Still another object of the invention is the provision of a flexible criterion for evaluating the degree of permissible error between an output signal and the desired signal, thereby enabling a designer to achieve a desired degree of match between the output and desired signals over selected regions while lessening the complexity of the apparatus which effects this match.

Still a further object of the invention is the provision of a method and apparatus for determining optimum filters for a maximum probability criterion, and provide the optimum filters thus determined.

It is an object of the invention to provide means for improving the performance of a given filter.

It is another object of the invention to reduce the complexity of filters by providing a linear filter in combination with a simple nonlinear filter, the combination having a response characteristic which approximates a desired response.

It is still another object of the invention to provide a method for determining which desired response characteristics may be substantially realized with networks in the form of a linear filter in combination with a simple nonlinear filter.

It is a further object of the invention to provide a method for reducing the complexity of a given system by decomposing the latter into parallel connected component systems which may be synthesized in accordance with one or more of the preceding objects.

It is still a further object of the invention to provide a method for optimization of the Laguerre function scale factor.

In accordance with one or more of the preceding objects, it is an object of the invention to provide a method and means for determining each coefficient which characterizes the desired system sought to be synthesized, independently of all the other coefficients, regardless of system complexity.

In accordance with one or more of the preceding objects, it is another object of the invention to provide apparatus indicative of the instantaneous amplitude level of an input signal and responsive to exceedingly rapid changes in the aforesaid level.

It is an object of the present invention to provide apparatus according to the preceding object which is capable of rapidly indicating the probability distribution of an input signal having spectral components of a frequency many times higher than that to which prior art apparatus responds.

According to the invention, an input signal, having a first signal component with a characteristic having values arranged according to a first distribution, which may be random, and possibly other signal components with values of the said characteristic arranged according to a different distribution, is compared with a second signal to yield signals indicative of coefficients which characterize a system which will respond to the input signal by providing substantially the second signal. For optimum filtering, both the first signal component and the second signal are the desired signal and the other signal components are unwanted signals, such as noise and interfering signals. For optimum predicting, the first signal is the second signal delayed.

For optimum multiple prediction, there are a plurality of input signals each having a first signal component characteristic of selected data and a status signal which is characteristic of a situation or event related to the selected data and contemporaneously therewith. The second signal is the status signal advanced in time.

Apparatus for determining these coefficients includes means responsive to the input signal which provides an output signal only when the contemporary value of the aforesaid input signal characteristic lies within a selected region related to the respective coefficient being determined. For each selected region gating means energized by the latter output signal and a signal related to a predetermined weighting function are provided. Thus, the weighting function signal is provided as a gated output signal when the value of the input signal characteristic lies within the associated selected region. In the preferred arrangement, the output signal energizing the gating means is either zero or a constant; hence, the gated output signal is effectively the product of the energizing output and weighting function signals. The gated output signal is multiplied with the aforesaid second signal to derive a product signal. Means are provided for averaging the gated output signal and the latter product, the ratio of the respective average values determining the coefficient associated with the respective selected region.

To synthesize the system with the coefficients thus determined, apparatus is provided which includes means responsive to the input signal for providing an output signal only when the contemporary value of the aforesaid input signal characteristic lies within a selected region related to a respective coefficient determined in the above manner, and means associated with each selected region for imparting a gain related to the respective coefficient to the associated output signal. The output signals with the selected gains imparted thereto are cumulatively combined to provide the desired output signal.

In one form of the invention, the aforesaid characteristic is the signal amplitude. Accordingly, each selected region encompasses an incremental amplitude region within which the input signal amplitude may lie, the respective regions being mutually exclusive. Thus, at any one instant of time, the means responsive to the input signal provides an output signal characteristic of the input signal lying within but one of the selected regions.

A preferred form of the amplitude level selector comprises means for generating an electron beam, a plurality of adjacent electron collecting targets, means responsive to an input signal for deflecting the beam so that it impinges upon a collecting target related to the contemporary input signal amplitude, and means for sensing the electrons which impinge upon each target. This apparatus is also useful in the measurement of probability densities and distributions including higher order probability distributions, as a function generator, and for many other uses.

Other features, objects and advantages of the invention will become apparent from the following specification when read in connection with the accompanying drawing in which:

FIG. 1 is a graphical representation of a normalized gate function which encompasses a selected region of signal amplitude;

FIG. 2 is a block diagram of apparatus for determining the optimum filter coefficients for no-storage filters;

FIG. 3 is a stepwise representation of a typical optimum transfer characteristic;

FIG. 4 is a block diagram of apparatus which may be adjusted to have the desired optimum transfer characteristic;

FIG. 5 illustrates a typical transfer characteristic of a no-storage non-linear system;

FIG. 16 is a block diagram of the class of filters consisting of a given filter cascaded with a no storage filter;

FIG. 17 is a block diagram of apparatus suitable for use as the filter determined with the apparatus of FIG. 15;

FIG. 18 is a block diagram of apparatus for determining a filter for connection across a given filter to improve the performance of the latter;

FIG. 24 is a graphical representation of a coefficient test for another specific example;

Figure 6:
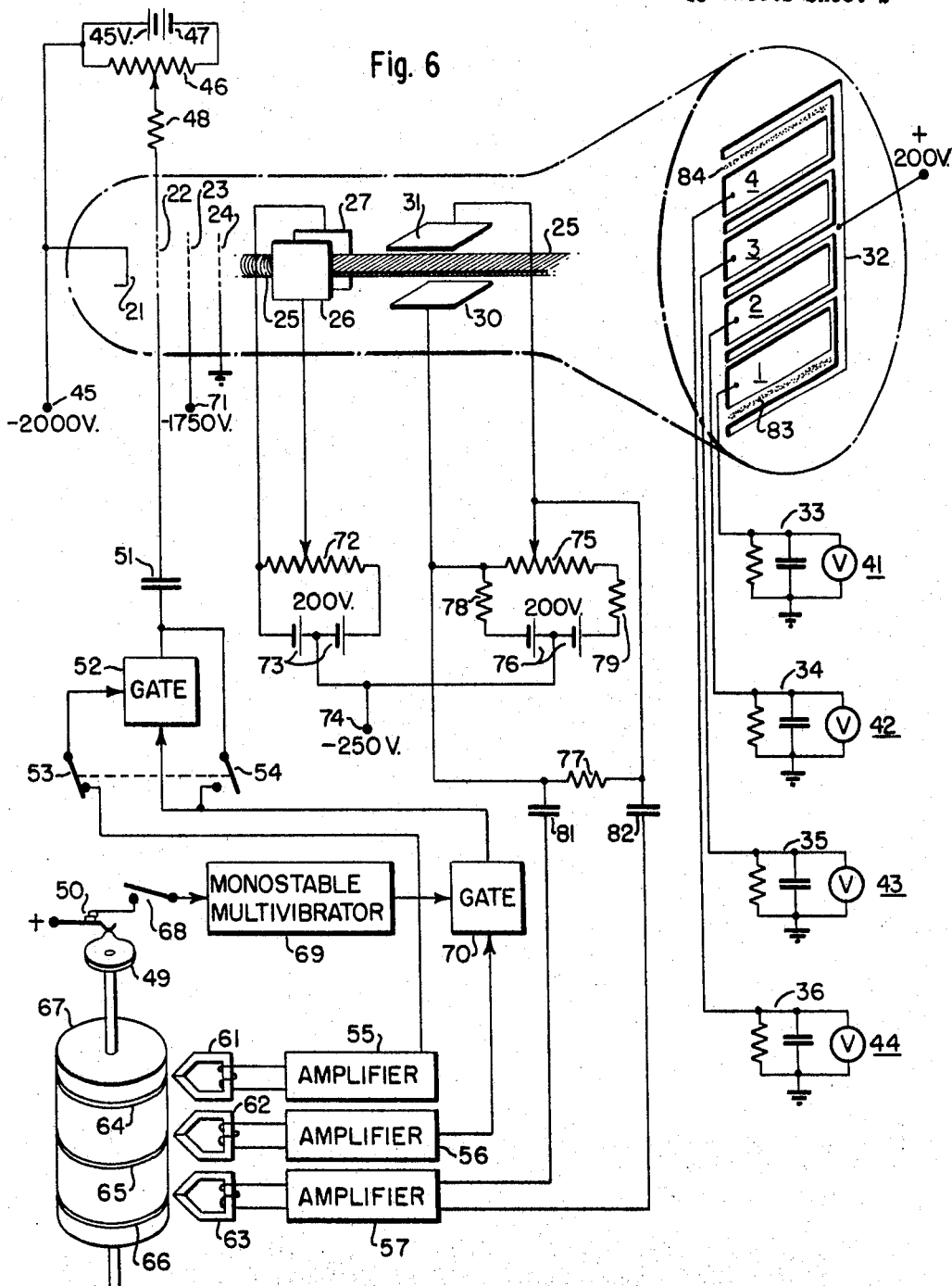
FIG. 6 illustrates a representative embodiment of apparatus for determining the coefficients which characterize an optimum transfer characteristic.

With reference now to the drawing and more particularly FIG. 1 thereof, there is illustrated a graphical representation of a normalized gate function which encompasses a selected region of signal amplitude. Its significance will be better understood from the discussion which follows.

Instead of following the prior art approach of assuming a statistical knowledge of the filter input and desired output the approach to the nonlinear filter problem developed herein assumes that an ensemble member of the filter input time function $x(t)$ and the corresponding ensemble member of the desired filter output $z(t)$ is available. By recording or making direct use of a portion of the given filter input time function, the ensemble member of $x(t)$ is obtained. The ensemble member of $z(t)$ can be determined in different ways depending upon the problem. For pure prediction problems $z(t)$ is obtained directly from $x(t)$ by a time shift. For filter problems involving the separation of signal from noise at the receiver in a communication link, in the program for the design of the filter, a portion of the desired signal $z(t)$ may be recorded at the transmitter and the corresponding portion of $x(t)$ at the receiver. For radar type problems, in the program for the design of the filter, $z(t)$ can be generated corresponding to signals $x(t)$ received from known typical targets.

Since the ensembles of $x(t)$ and $z(t)$ contain all the statistical information concerning the filter input and desired output, and since direct use shall be made of these time functions in the filter determination, it is not necessary to make any assumptions about the distributions of $x(t)$ and $z(t)$. Thus, for example, in the problem of designing a filter to separate signal from noise no assumptions need be made about the statistics of the signal or noise or about how the two are mixed. A filter designed according to the invention is capable of selecting the desired signal from an input signal which includes the desired signal multiplicatively combined with noise.

Note that in most practical cases the assumption of having a portion of $x(t)$ and $z(t)$ is not any more restrictive than the usual assumptions of knowing the higher order probability densities of the input and desired output; for at present, except in very simple cases, the only practical way of obtaining these statistics is to measure them from ensembles of $x(t)$ and $z(t)$ when these ensembles are available. When they are available, the approach followed according to the invention makes measurements on them that directly yield optimum filters instead of first measuring the distributions and then solving design equations in terms of these measured values.

When the given filter input is not shot noise, the method of Wiener cannot be applied to determine the optimum filter. The orthogonality relations which led to Eq. 12 for the $A_a$'s depended upon the fact that the Laguerre coefficients were gaussianly distributed and statistically independent, and this fact, in turn, depended on the fact that the input to the Laguerre network was shot noise. When $x(t)$ is not shot noise, the independent relations (Eq. 12) for the $A_a$'s are no longer obtained and the procedure for determining them by the method of Wiener is no longer valid. Thus, the need of an expression for a nonlinear operator in which the terms in its series representation are orthogonal in time, irrespective of the nature of the input time function is appreciated.

An orthogonal representation for nonlinear systems that enables the convenient determination of optimum nonlinear filters is developed below. The development is best described if, before proceeding to the general filter, the class of no-storage nonlinear filters is first examined.

By a no-storage system it is meant one whose output, at any instant, is a unique function of the value of its input at the same instant. The input-output characteristic of this system is called the transfer characteristic.

Let $x(t)$ and $z(t)$ be the given filter input and desired filter output time functions, respectively. Assume that $x(t)$ and $z(t)$ are bounded, continuous time functions. This is clearly no restriction in the practical case and it enables attention to be confined to approximating desired filter transfer characteristics that are bounded and continuous. Since $x(t)$ is bounded, there exists an $a$ and $b$ such that $a \leq x(t) \leq b$ for all $t$. Now consider a set of $n$ functions $\phi_j(x)$ ($j=1, \ldots, n$) over the interval $(a,b)$. These functions are defined as follows $$\phi_j(x) = \begin{cases} 1 \text{ for } x_j - \frac{w}{2} \leq x < x_j + \frac{w}{2} & j=(1, \cdots, n-1) \\ \text{and } x_j - \frac{w}{2} \leq X \leq b, & j=n \ \ w=\frac{b-a}{n} \\ 0 \text{ for all other } x & x_j = a + w\left(j - \frac{1}{2}\right) \end{cases}$$

(13)

A plot of the $j$th function of this set of functions is shown in FIG. 1. (A separate definition is given for $\phi_n(x)$ in order to include the point $b$. In practical application of these functions, $n$ gate functions of equal width that cover the interval $(a, b)$ are generated.) Clearly this set of functions is normal and orthogonal over the interval $(a, b)$. These functions shall be referred to as "gate functions." It is convenient to define $y$ as a gate function expansion of $x$ as follows $$y = \sum_{j=1}^{n} a_j \phi_j(x) \quad (14)$$

By taking $n$ sufficiently large $y$ can be made to approximate any single-valued continuous function of $x$ arbitrarily closely everywhere on the interval $(a, b)$.

When $x$ is a function of time, it is convenient to write Eq. 14 as $$y(t) = \sum_{j=1}^{n} a_j \phi_j[x(t)] \quad (15)$$

As a consequence of the non-overlapping property of the gate functions along the $x$ axis the $\phi_j[x(t)]$ will, for any single valued time function $x(t)$, form an orthogonal set in time as well as an orthonormal set in $x$. Further this time domain orthnogonality holds for any bounded weighting function $G(t)$. That is $$G(t)\phi_j[x(t)]\phi_k[x(t)] = \begin{cases} 0 & j \neq k \\ G(t)\phi_j^2[x(t)] & j=k \end{cases} \quad (16)$$

Relation 15 specifies the form of an equation that defines a no-storage nonlinear system. The determination of an optimum no-storage filter for a given error criterion consists of choosing the $a_j$'s in such a manner that, for a given $x(t)$, the error between $y(t)$ and the desired output $z(t)$ is a minimum. It is advantageous to adopt a weighted mean square error criterion in which $G(t)$ is, as discussed later, a non-negative weighting function at the disposal of the designer. More specifically, the error $$\epsilon = \lim_{T \to \infty} \frac{1}{2T} \int_{-T}^{T} G(t) \left\{ z(t) - \sum_{j=1}^{n} a_j \phi_j[x(t)] \right\}^2 dt \quad (17)$$

is minimized with respect to the $n$ coefficients $a_j$. Differentiating with respect to $a_k$ and setting the result to zero $$\frac{\partial \epsilon}{\partial a_k} = \lim_{T \to \infty} \frac{1}{2T} \int_{-T}^{T} -2G(t)\phi_k[x(t)] \left\{ z(t) - \sum_{j=1}^{n} a_j \phi_j[x(t)] \right\} dt = 0 \ k=(1, \cdots, n) \quad (18)$$

Denoting the operation of time averaging by a bar above the averaged variable Eq. 18 can be written $$\overline{G(t)\phi_k[x(t)]\sum_{j=1}^{n} a_j \phi_j[x(t)]} = \overline{z(t)G(t)\phi_k[x(t)]} \quad (19)$$

Making use of the time domain orthogonality of the gate functions (Eq. 16), Eq. 19 reduces to $$\overline{a_k G(t)\phi_k^2[x(t)]} = \overline{z(t)G(t)\phi_k[x(t)]} \quad (20)$$

It follows from the definition of the $\phi_j(x)$ given in Eq. 13 that $$\phi_j[x(t)] = \phi_j[x(t)]$$
$$\phi_j^2[x(t)] = \phi_j[x(t)]$$

so that Eq. 20 is equivalent to the equation $$\overline{a_k G(t)\phi_k[x(t)]} = \overline{z(t)G(t)\phi_k[x(t)]} \quad (21)$$

This equation provides a convenient experimental means of determining the desired coefficients $a_k$. Referring to FIG. 2, there is illustrated apparatus for evaluating these coefficients. An ensemble member of $x(t)$ is fed into level selector circuit 11 and the corresponding ensemble member of $z(t)$ is fed into the product averaging circuit 12. The output of level selector circuit 11 is unity whenever the amplitude of $x(t)$ falls within the interval of the $k$th gate function and zero at all other times. This output is applied to gate circuit 13 to gate the weighing function $G(t)$. The output of gate circuit 13 is then average by averaging circuit 14 and also multiplied by $z(t)$ and averaged in product averaging circuit 12 to yield the two quantities necessary to determine $a_k$ in Eq. 21, the ratio of the output of product averaging circuit 12 to the output of averaging circuit 14 being $a_k$.

From a knowledge of the $a_k$, a stepwise approximation, like that of FIG. 3,, to the desired optimum transfer characteristic may be directly constructed (see Eq. 14). The synthesis of the filter can be carried out according to Eq. 14 by using level selector circuits and an adder as shown in FIG. 4, or by any of the other available techniques, such as piecewise linear approximations or function generators.

With reference to FIG. 4, there is illustrated apparatus arranged to have the desired optimum transfer function. The input signal $x(t)$ energizes level selector 15, which includes means sensitive to each amplitude region of width $w$ for which a constant $a_k$ has been determined. Associated which each level for which there is an associated $\phi_j(x)$, there is a gain imparting means 16, the amount of gain imparted being related to the corresponding $a_k$. The output signals from the gain imparting means 16 are cumulatively combined in adding circuit 17 to provide the output signal $y(t)$, which closely approximates the desired signal $z(t)$.

In order to become more familiar with the operation and terminology of this method, consider a very simple example. In this example there will be performed analytically what, in practice, may be done experimentally with the apparatus of FIG. 2. Given an ensemble member of $x(t)$ and the corresponding ensemble member of $z(t)$, it is assumed that the desired filter output $z(t)$ is equal to $f[x(t)]$ where $f$ is a continuous real function of $x$. It is desired to verify that the filter determined by the procedure utilizing the apparatus of FIG. 2 is actually a stepwise approximation to the transfer characteristic $f(x)$. For simplicity, assume that $n$ has been chosen sufficiently large so that the function $f(x)$ is approximately constant over the width of the gate functions and choose $G(t)$ equal to a constant so that the conventional mean square error criterion results. For these conditions whenever $\phi_k[x(t)]$ has a non-zero value, $x$ must lie in the interval of width $w$ about $x_k$, and $z(t)$ is approximately equal to $f(x_k)$. Equation 21 becomes $$a_k \overline{\phi_k[x(t)]} \approx f(x_k) \overline{\phi_k[x(t)]} \quad (22)$$

from which $$A_k \approx f(x_k) \quad (23)$$

for the $a_k$ which shows (see Eq. 14) that they determine a filter that is a stepwise approximation to the desired transfer characteristic $f(x)$. (A closer examination of this example shows that the same results are obtained for any weighting function $G(t)$. This is because for this example the desired filter is a member of the class of no-storage filters and hence as $n \to \infty$ the error $\epsilon$ in Eq. 41 can be made zero for any $G(t)$.)

In addition to knowing that as $n \to \infty$ the gate function expansion (Eq. 14) can approximate any continuous transfer function arbitrarily closely, it is of practical interest to investigate how the expansion converges for small $n$ as $n$ is increased when the coefficients are chosen to minimize the mean square error. This is most easily done with the aid of an example. Let the transfer characteristic of FIG. 5 be the one that it is desired to approximate. The simplest gate function expansion is that for which $n=1$. The best mean square approximation clearly occurs for $a_1 = (y_1 + y_2)/2$. For $n=2$ the best approximation is seen to occur for $a_1 = y_1$ and $a_2 = y_2$. This approximation is considerably better than that for $n=1$. Now consider $n=3$. The best mean square approximation is, by inspection $a_1 = y_1$, $a_2 = (y_1 + y_2)/2$ and $a_3 = y_2$. But this is seen to be a worse approximation than that for $n=2$! For $n=4$ the approximation must be at least as close as for $n=2$ since $a_1 = a_2 = y_1$ and $a_3 = a_4 = y_2$ constitute a possible solution. Again, for this example, the approximation for $n=5$ is inferior to that for $n=2$ or 4 but better than the $n=3$ approximation. The reason for this peculiar convergence is that the function $f(x)$ changes appreciably in an interval that is small compared to the width of the gate functions, and hence the position of the gate functions along the $x$ axis is critical. For this example when $n$ is even, one gate function ends at $x=(a+b)/2$ and another begins, thus providing a nice fit to $f(x)$. For $n$ odd, one gate function straddles the point $x=(a+b)/2$, and because of symmetry it will have a coefficient equal to $(y_1 + y_2)/2$. As $n$ is increased beyond the point where the width $(w=(b-a)/n)$ of the gate functions becomes less than $\delta$, the position of the gate functions becomes less and less critical, the oscillatory behavior disappears and the expansion converges to $f(x)$ everywhere.

From this simple example some general conclusions may be drawn regarding the convergence of the gate function expansion to continuous functions. When the desired function changes appreciably in an interval of $x$ comparable to or smaller than $w$, it may happen that an increase in $n$ will result in a poorer approximation. However, if $n$ is increased by an integral factor, the approximation will always be at least as good as that before the increase. Further, if $n$ is taken large enough so that the function is essentially constant over any interval of width $w$, then any increase in $n$ will yield at least as good an approximation as before the increase. Thus, in the practical application of this theory, if an increase in $n$ results in an inferior filter, it is merely an indication that the desired filter characteristic has a large slope over some interval. By further increasing $n$, the desired characteristic will be obtained.

In the discussion above it was assumed for convenience that each gate function had the same width $w$. This is not a necessary restriction however. It is sufficient to choose them so that they cover the interval $(a,b)$ and do not overlap. Thus, if there is available some a priori knowledge about the optimum transfer characteristic, time and work in determining it may be conserved by judiciously choosing the widths of the $\phi_j(x)$'s. In fact, after evaluating any number $m$ of the $a_k$'s, the widths of the remaining functions $\phi_j(x)$ $(j > m)$ may be altered. This flexibility is permissible because in taking advantage of it, the time domain orthogonality of the gate functions is not disturbed.

With reference to FIG. 6, there is illustrated a novel level selector tube together with associated components which form apparatus suitable for determining optimum values of coefficients which characterize a system for providing a desired output signal in response to an input signal. The apparatus will be better understood after a discussion of its physical arrangement. Its mode of operation will then be described in detail in connection with an example wherein it is desired to determine an optimum system for selectively passing the desired components of an input signal.

The level selector tube is seen to comprise an electron gun having a cathode 21, control grid 22, first anode 23 and second anode 24 arranged to direct an electron beam 25 through deflection plates 26, 27, 30 and 31 and collector plate set 32 toward target strips 1, 2, 3 and 4. Respectively connected to each target strip 1, 2, 3 and 4 are integrating networks 33, 34, 35 and 36, each of the latter networks comprising a resistor shunted by a capacitor. Respectively connected across each intergrating network are voltmeters 41, 42, 43 and 44.

The cathode 21 is connected to terminal 45 which is maintained at a relatively high negative potential, in this example-2000 volts. Potentiometer 46 is connected across battery 47 and to terminal 45, supplying a biasing potential to grid 22 through resistor 48. Signals may be applied to grid 22 through capacitor 51 from the output of gate 52 when ganged switches 53 and 54 are respectively closed and open as indicated, or directly from amplifier 56 through gate 70 when the latter switch positions are reversed. The output of amplifier 56 is coupled to one input of gate 52 through gate 70, the other input of gate 52 being coupled to the output of amplifier 55. Amplifiers 55, 56 and 57 are respectively energized by reading heads 61, 62 and 63 which derive electrical signals by respectively scanning tracks 64, 65 and 66 on rotating magnetic drum 67.

A second input of gate 70 is energized by monostable multivibrator 69, which generates an output pulse of duration substantially equal to the time for drum 67 to complete one revolution in response to a positive potential applied to its input through switch 68. Switch 68 is preferably spring-loaded to remain normally open and couples the positive potential connected to switch 50 when drum 67 is positioned so that cam 49 closes the latter switch.

First anode 23 is connected to terminal 71 which is maintained at a potential positive with respect to that on terminal 45, the terminal 71 potential in this example being −1750 volts. Second anode 24 and the aquadag coating inside the tube (not illustrated to avoid obscuring constructional details of the tube) are maintained at substantially ground potential, in this example, substantially 2000 volts above cathode potential. Potentiometer 72 is connected across battery 73 and to deflection plate 27, its arm being connected to deflection plate 26. The center tap of battery 73 is connected to terminal 74, which is maintained at a potential much higher than the cathode potential. In this example terminal 74 is at —250 volts. Potentiometer 75 is connection through resistors 78 and 79 to battery 76 and to deflection plate 30, its arm being connected to deflection plate 31. The center tap of battery 76 is connected to terminal 74. In this example, the potential across batteries 73 and 76 is 200 volts. Signals are coupled in a push-pull arrangement from the output of amplifier 57 to deflection plates 30 and 31 through capacitors 81 and 82 respectively. Resistor 77, whose value is much larger than that of potentiometer 75, is connected across deflection plates 30 and 31.

The plane parallel to deflection plates 26 and 27 is perpendicular to the plane parallel to deflection plates 30 and 31, and the latter two planes are perpendicular to the plane in which target strips 1, 2, 3 and 4 lie. The projection of deflection plates 30 and 31 on the latter plane, is substantially parallel to the long dimension of the strips.

Before describing the operation of the system for the determination of coefficients which characterize an optimum filter, the mode of operation of the level selector tube will be described. An electron beam is generated by the electron gun, which may be the electron gun used in a 5UP1 cathode ray tube. Although the beam emerges from the gun having a substantially circular cross-section, it has been discovered that by maintaining a potential difference between first anode 24 and deflection plates 26 and 27, the beam emerges from the region between the latter two plates having a substantially rectangular cross-section, the long dimension being substantially perpendicular to the plates. It has also been discovered that if deflection plates 30 and 31 are not maintained at a potential relatively near the potential on plates 26 and 27, a defocussing effect is observed at the plane which includes the target strips. The beam thus formed impinges upon one of the target strips, the long dimension of its cross-section being substantially parallel to the long edge of the strip. An advantage of a beam of rectangular cross section is that for a given current, the current density upon a target strip is small. Hence, the danger of damaging a strip is minimized.

To facilitate initial adjustment of the beam position and focusing, there are provided a phosphorescent strip 83 below target strip 1 and a similar strip 84 above target strip 4. The beam shape and orientation may be observed by adjusting potentiometers 72 and 75 until the beam impinges upon phosphorescent strip 83. Potentiometer 72 is adjusted to move the beam left or right until it is centered about a line which substantially bisects the target strips. The potential upon terminal 74 may then be adjusted until a sharply focused rectangular image is observed on strip 83. If the long dimension of this image is not parallel to the long dimension of the target strips, a magnetic lens may be positioned about the tube axis near the electron gun and utilized to rotate the beam until the desired parallel relation is observed. The potential on terminal 74 may then require additional adjustment to achieve optimum focus.

The beam position responds to changes in potential across plates 30 and 31 by moving up or down, thus the instantaneous potential across the latter plates determines upon which strip the beam will impinge. If the strip width is large compared to the spacing between strips and the small dimension of the beam relatively narrow, at any one instant of time, the beam will impinge upon one and only one strip, thereby effecting a current flow in the lead connected to the energized strip. The strip thus energized is indicative of the contemporary potential difference across the plates. If a time varying signal is applied across the plates having an amplitude variation sufficiently small so that the beam is not deflected below the lowest target strip, nor above the highest, and the current flowing in each strip lead is separately integrated, the charge thus accumulated is indicative of the probability that the amplitude of the time varying signal lies within the region of amplitude levels effective in positioning the beam on the respective strip. Accordingly, the tube may be utilized for the measurement of the probability distribution of an input signal. Since the input signal may be applied directly to the deflection plates, probability measurements may be made of input signals having spectral components of hundreds of megacycles.

The maximum variation in signal amplitudes for application to the deflection plates may be determined by measuring the potential change on the arm of potentiometer 75 as the latter is adjusted to move the beam from phosphorescent strip 83 to phosphorescent strip 84. The gain of amplifier 57 may then be adjusted so that its output signal does not exceed these limits for the expected input signal variations.

While only four target strips are illustrated in FIG. 6 in order to more clearly illustrate the principles involved, as a practical matter, it may be desirable to use many more strips. Thus, the region over which the input signal amplitude may vary is divided into many narrow closely-spaced regions to yield desired results almost instantaneously.

The tube is operable even with a single target strip; however, a plurality of measurements are then required. After each measurement, the setting of potentiometer 75 is changed by a selected increment and the input signal applied to deflection plates 30 and 31 on the preceding measurement again applied, thus yielding a measured value related to the level selected in accordance with the setting of potentiometer 75.

The tube has still other features. The target strips are of a material which exhibits a secondary emission effect whereby more electrons are emitted than impinge upon the strip. Thus, a higher output current is obtained in the strip leads. Collector 32 is maintained at a potential higher than that of the target strips whereby it attracts the secondarily emitted electrons and prevents them from striking adjacent target strips to cause undesired cross-talk effects. The preferred strip material is an alloy of beryllium and copper. This material is especially advantageous since its highest secondary emission ratio occurs at a potential of substantially 2000 volts, the potential difference between the cathode and strips in the exemplary embodiment of the tube.

For further details of the novel tube and the results of measurements made therewith, reference is made to a thesis of Joseph Tierney entitled A General Study of No-Storage Filters submitted in partial fulfillment of the requirements for the degree of Master of Science at the Massachusetts Institute of Technology in June 1956.

The above description of the mode of operation of the level selector tube will facilitate understanding its use in connection with the determination of coefficients for characterizing an optimum filter. In considering system operation, it is convenient to assume that an ensemble member of the input signal $x(t)$ is recorded upon track 66, a corresponding ensemble member of the desired signal $z(t)$ is recorded upon track 64, and a weighting function signal $G(t)$ is recorded upon track 65. If corresponding portions of the respective signals were initially recorded by energizing recording heads in vertical alignment, then for determination of the optimum filter, reading heads 61, 62 and 63 are preferably in vertical alignment as illustrated in FIG. 6.

Figure 7:
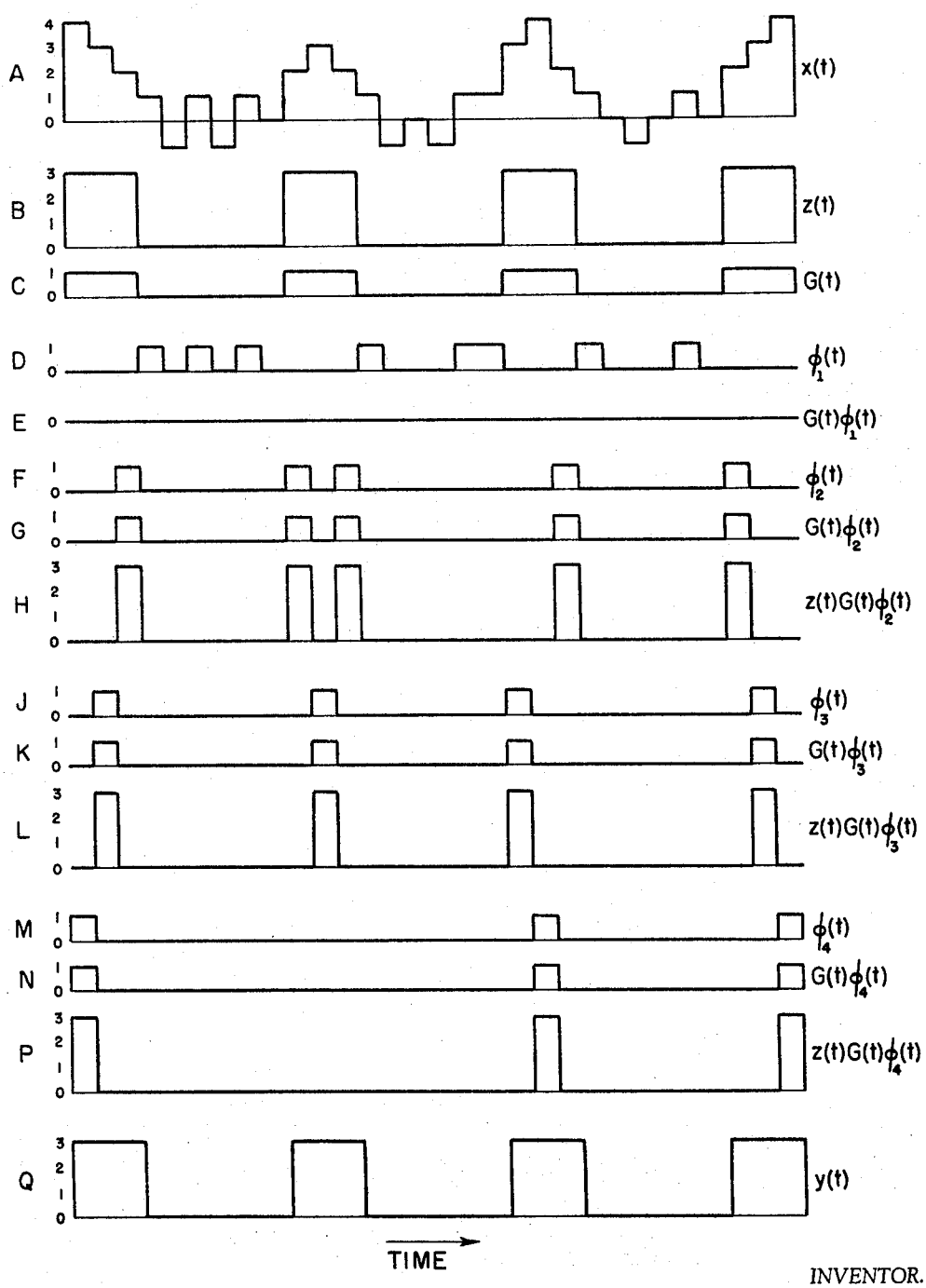
FIG. 7 is a graphical representation of signal waveforms helpful in understanding the mode of operation of the apparatus of FIG. 6.

Referring to FIG. 7, there is illustrated a graphical representation of signal waveforms as a function of time which facilitate understanding the system mode of operation. The illustrated waveforms are relatively simple in order to more clearly exhibit the principles of operation. The signal amplitudes are represented in normalized amplitude units. In FIG. 7A, there is illustrated the input signal $x(t)$, derived at the output of reading head 63, which includes the desired signal $z(t)$ of FIG. 7B contaminated by an undesired signal component. It is seen that the input signal $x(t)$ may assume one of four positive amplitude levels. In this example, only the coefficients associated with these levels will be determined; however, it is to be understood that the apparatus is equally capable of determining the optimum value of coefficients associated with negative amplitude levels.

As indicated above, the coefficient associated with the $j$'th amplitude level is determined by the equation $$a_j = \frac{\overline{z(t)\phi_j(t)G(t)}}{\overline{\phi_j(t)G(t)}}$$

Thus, the coefficient is determined by the ratio of the average values of two product signals, one the product of the desired signal, the gate function signal, and the weighting signal, while the other is the product of the gate function signal and the weighting function signal. The apparatus is arranged so that initially the average value of the latter product signal is determined and then the average value of the former product signal. The ratio of the latter value to the former value is the desired characterizing coefficient associated with the $j$'th amplitude level.

To determine the average value of $\phi_j(t)G(t)$, switch 53 is opened and switch 54 is closed. The weighting function signal $G(t)$, illustrated in FIG. 7C, is derived at the output of reading head 62 by scanning track 65. This signal is amplified by amplifier 56 and applied to the grid 23 of the tube through capacitor 51, gate 70 and switch 54. The reason for the presence of gate 70 is discussed below. Potentiometer 46 may be adjusted so that the selector tube is just cut off when the amplitude of the weighting function signal is substantially zero. When the latter amplitude becomes one, the tube is rendered conductive and the contemporary amplitude level of $x(t)$ will determine which target strip is then energized.

The advantage of having a flexibly determinable weighting function now becomes apparent. Since a priori information is available concerning the periodicity of the desired signal and the width of each desired pulse, the weighting function signal is selected to bracket each pulse in the desired signal $z(t)$. The function of the weighting function signal is to exercise control over the amount of current supplied to the integration network associated with the target strip then selected. In the exemplary system of FIG. 6 this is accomplished by coupling the weighting function signal to the grid 23 of the level selector tube; however, this signal may instead be applied to separate gates interposed between each strip and its associated integration network. An advantage of the last-mentioned arrangement is that the amplitude of the weighting function signal associated with each level may be selected in accordance with available a priori amplitude information. For example, if it were known that low amplitude levels of the input signal $x(t)$ were most likely due to noise, low weight would be given to such amplitude levels when sensed.

With the weighting function signal of FIG. 7C applied to grid 22 through switch 54, gate 70 and capacitor 51, the tube is rendered conductive when the amplitude of this signal is one. During these intervals, current flows in the lead associated with the strip selected in accordance with the contemporary value of the input signal level.

With reference to FIG. 7D, there is illustrated the function $\phi_1(t)$. It is seen that this function is one at times coincident with $x(t)$ being one and zero at all other times. $\phi_1(t)$ being one corresponds to a potential across deflection plates 30 and 31 which would be effective in directing the electron beam, if then generated, upon target strip 1. However, since $G(t)$ is zero when $\phi_1(t)$ is one and vice-versa, the product of the two signals is zero as indicated in FIG. 7E. Physically, this means that when $\phi_1(t)$ is one, the level selector tube is cut off. Thus, integration network 33 is never supplied with current and $a_1$ is zero.

With reference to FIG. 7F, it is seen that $\phi_2(t)$ is one only when $x(t)$ is two, otherwise being zero. Since $\phi_2(t)$ is one during intervals coincident with $G(t)$ being one, the product of the two signals is one during such intervals as represented in FIG. 7G. Physically, this means that during the intervals this product is one, the tube is on with the electron beam directed at strip 2. Accordingly, current pulses are applied to integrating network 34, thereby charging the capacitor thereof to a potential indicative of the average value of this product signal. This potential is measured by voltmeter 42. The time constant of each integrating network should be long compared to the duration of the particular ensemble signal $x(t)$. For example, if the duration of the latter signal were the time consumed in one revolution of drum 67, the time constant is preferably greater than ten times such period of time.

Analogous to the situation with respect to the function $\phi_2(t)$, the functions $\phi_3(t)$ and $\phi_4(t)$ are graphically represented as a function of time in FIGS. 7J and 7M respectively and the product signals, $G(t)\phi_3(t)$ and $G(t)\phi_4(t)$, in FIGS. 7K and 7N respectively. A potential related to the average value of the latter product signals is indicated by voltmeters 43 and 44 respectively. Having thus determined the average values of one set of product signals, switch 53 is closed and switch 54 opened, thereby readying the apparatus for the determination of the average value of the product signal $z(t)G(t)\phi_j(t)$.

Before discussing the determination of the latter average values, it is appropriate to discuss the rationale for the inclusion of gate 70. As indicated above, the respective integration networks integrate current, the accumulated charge being indicated by the voltage on the capacitor as indicated by the associated voltmeter. Since the ratio of the average value of two signals is to be determined, if the ratio of two voltages each proportional to the time integral of the respective signals is to be utilized, the integration of each signal should occur for the same duration. This is accomplished by utilizing gate 70 and associated apparatus.

When it is desired to make a measurement, spring-loaded switch 68 is held closed until cam 67 is observed to close the contacts of switch 50, thereby applying a positive potential to monostable multivibrator 69. This triggers multivibrator 69 which responds by providing a gating pulse to gate 70, the duration of this pulse being preferably substantially equal to the time for drum 67 to make one revolution. Thus, gate 70 is open for one drum revolution during which measurements are obtained. Since switch 68 is thereafter opened, gate 70 is closed when the gating pulse from multivibrator 69 terminates. Since without weighting function pulses, the level selector tube is cut off, the disabling of gate 70 effectively renders the apparatus inoperative until it is desired to make the next measurement and switch 68 is closed, switch 53 now being closed and switch 54 open.

The desired signal $z(t)$ and the weighting function signal $G(t)$ both energize gate 52. Gate 52 is preferably arranged so that when $z(t)$ and $G(t)$ are both one, an output signal of amplitude one is coupled to grid 23. Amplifier 55 is preferably arranged to have a transfer characteristic which substantially compensates for the fact that the electron beam current is substantially proportional to the grid voltage to the $3/2$ power. In other words, the output voltage from amplifier 55 is substantially proportional to the input voltage taken to the $2/3$ power. Such a characteristic is readily attainable with the well-known diode function generators. With gate 52 and amplifier 55 arranged to provide the aforesaid characteristics, the electron beam current will be related to the product of $z(t)$ and $G(t)$ by substantially the same proportionally constant which related the beam current to $G(t)$ in the preceding set of measurements. Thus, when $z(t)$ and $G(t)$ are applied to gate 52 simultaneously with the input signal $x(t)$ being applied across deflection plates 30 and 31, each voltmeter reading then indicated is divided by the reading obtained from the preceding set of measurements when switch 53 was open and switch 54 closed, to obtain the characterizing coefficient associated with the respective level. In fact, if a potentiometer is connected across each integrating network, each voltmeter is connected between the arm of a respective potentiometer and ground, and each potentiometer adjusted when the first set of measurements are taken so that the associated voltmeter reads one volt, the reading of each voltmeter in volts when the second set of measurements are taken, is the value of the characterizing coefficient identified with the respective level.

The product signals $z(t)G(t)\phi_2(t)$, $z(t)G(t)\phi_3(t)$ and $z(t)G(t)\phi_4(t)$ are graphically represented as a function of time in FIGS. 7H, 7L and 7P respectively. It is seen that each pulse in the latter signals occurs during the same time interval that a pulse in a signal $G(t)\phi_j(t)$ directly above; however, the amplitude of the pulses in the former signals are three times the amplitude of pulses in the latter signals. Accordingly, the average value of each of the former signals is three times that of the latter signals and the coefficients $a_2$, $a_3$ and $a_4$ equal to three. A system synthesized according to these characterizing coefficients will thus not respond to amplitude levels of an input signal below two or above four. Within these limits, its response will be a signal of amplitude three. A system having this characteristic responds to the input signal $x(t)$ of FIG. 7A to provide an output signal $y(t)$ graphically represented in FIG. 7Q. Note that for this example $y(t)$ exactly coincides with the desired signal $z(t)$.

Figure 8:
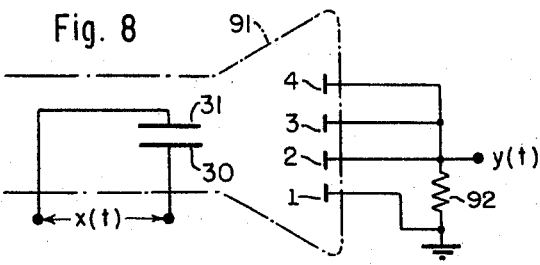
FIG. 8 is a schematic representation of apparatus which responds to the input signal of FIG. 7A to yield the desired output signal of FIG. 7C.

With reference to FIG. 8, there is illustrated a system having the aforesaid characteristic. The level selector tube 91 is the level selector tube of FIG. 6; however, it is represented in schematic form in FIG. 8. The input signal $x(t)$ is applied across deflection plates 30 and 31 to switch the electron beam from plate to plate in accordance with the instantaneous amplitude level of the input signal. Thus, whenever the input signal amplitude is such that the beam is directed on target strips 2, 3 or 4, substantially the same current flows through resistor 92; otherwise the current flow therethrough is substantially zero. The value of resistor 92 may be adjusted to yield the desired output signal level for a given beam current.

Figure 9:
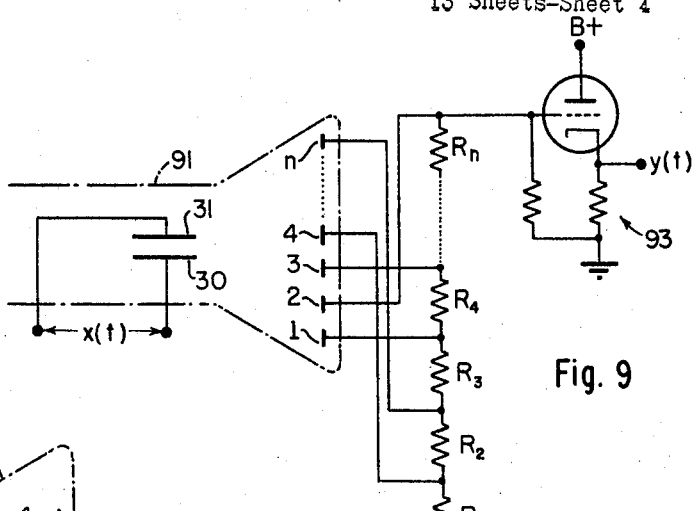
FIG. 9 is a schematic representation of apparatus of general utility in synthesizing optimum transfer characteristics.

Referring now to FIG. 9, there is illustrated the apparatus of FIG. 8 arranged with more target strips and output resistors to illustrate the general procedure for synthesizing a desired system. It is seen that each target strip is connected to a tap on a serially-connected chain of resistors connected between ground and the high impedance input of a cathode follower circuit whose output is $y(t)$.

The method of determining the relative values of the resistors will be more easily understood by assuming that the beam current is one ampere. The target strip associated with the amplitude level having the lowest valued characterizing coefficient is connected to the resistor connected to ground. For example, this may be strip 4 as illustrated. The value of $a_4$ is then equal to $R_1$. The strip associated with the amplitude level having the next lowest valued characterizing coefficient is connected to the next tap in the serial chain, which is the junction of resistors $R_2$ and $R_3$. This strip may be strip $n$ as illustrated. The value of $a_n$ is then equal to $R_1 + R_2$. If strip 1 is associated with the amplitude level having the next lowest characterizing coefficient, it is connected to the junction of resistors $R_3$ and $R_4$ and the coefficient $a_1$ has the value $R_1 + R_2 + R_3$. If strip 3 is associated with the level having the next lowest coefficient, it is connected to the top of resistor $R_4$ and has the value $$R_1 + R_2 + R_3 + R_4$$

Finally, the strip associated with the level having the highest coefficient is connected to the top of resistor $R_n$. If this is strip 2, the value of $a_2$ is $$\sum_{j=1}^{n} R_j$$

It is apparent that this arrangement may be utilized as a function generator in addition to its utility in synthesizing an optimum signal translating system.

The apparatus of FIG. 6 is suitable for determining the optimum predictor also. Reading head 61 is positioned so that it scans track 66 in advance of head 63, a constant weighting function signal may be utilized by disabling amplifier 56 and adjusting potentiometer 46 so that the tube is conductive and switch 53 is connected to capacitor 51. The spacing between reading heads 63 and 61 is related to the desired proximity in time of the future value to the present value, the closer in time the two values, the closer the spacing between the heads.

Before discussing the determination of optimum systems which include storage, that is to say, the output is a function of the past of the input as well as the present, some concepts which facilitate understanding the more general system will be discussed.

As indicated above, the past of a time function may be characterized by the coefficients of a complete set of orthogonal functions, such as the Laguerre functions. It helpful to think of a function space which has as a basis the Laguerre functions. Just as in a vector space a given vector can be represented as a linear combination of the basis vectors, so in function space a given function (satisfying appropriate regularity conditions) can be represented as a linear combination of the functions that form the basis of the space. The Laguerre coefficients of a function $x(t)$ may be thought of as being the scalar components of $x(t)$ along the respective basis vectors. At any instant, the past of $x(t)$ is represented by the point in function space corresponding to the tip of the vector whose scalar components are the Laguerre coefficients of the past of $x(t)$.

It was also indicated above that any function of the past of $x(t)$ can be expressed as a function of the Laguerre coefficients of this past. In terms of the function space then, a function of the past of $x(t)$ can be expressed as a function of position in this space. The desired function of the past of $x(t)$ may be generated by a transformation that maps the function space onto a line, the line corresponding to the amplitude of the desired function. This concept is helpful in understanding linear and non-linear systems. Consider the Wiener theory in this light. The output of the general Wiener nonlinear system is expressed (Eq. 11) as a Hermite function expansion of the Laguerre coefficients of the past of the input time function. The Laguerre functions form the basis of the function space of the past of the input and the Hermite function expansion maps this space onto a line—the amplitude of the system output.

Several important concepts follow from this viewpoint. The first, as indicated by the Wiener theory, is that any system (of the broad class considered in the Wiener theory) can be represented by the cascade of a linear system followed by a no-memory nonlinear system. The outputs of the linear system characterize the past of the input as a point in function space and the no-memory nonlinear system maps this space onto a line. Secondly, it is seen that in principle (assuming that the complete set of Laguerre functions is used) the difference between any two systems is accounted for by a difference in the no-memory part that performs the mapping. For example, if the mapping is linear (this case is discussed below) then a linear system is represented, if it is not, then a nonlinear system is represented. Since the difference between two systems is just in the mapping, the problem of determining an optimum system for a desired performance and given error criterion becomes that of determining the optimum no-memory system which maps the function space onto the output.

Finally, it is seen that this function space point of view provides the key for finding a general orthogonal expansion for the output of a nonlinear system. For reasons that will become evident, it is desired to obtain a series expansion for the output of a nonlinear system in which the terms are mutually orthogonal in time. Furthermore, it is required that this orthogonality be independent of the input time function. This is achieved by choosing a mapping that partitions the function space into non-overlapping cells and by letting each term in the series expansion represent the system output for a particular cell in the function space. Since at any instant the past of the input is represented by only one point in the function space, only one term in the series expansion will be non-zero at any instant: thus, all the terms are mutually orthogonal in time. The gate function expansion for the no-storage filter (Eq. 15) is recognized to be an application of this approach in the simple case for which the input space is just a line. This approach is applied in the discussion which follows to the more general case of a finite dimensional space. (Note: Although the function space discussed above is infinite dimensional, the term is used even when speaking of a finite number of Laguerre functions.)

The class of nonlinear systems to be considered now is the same as that of the Wiener theory. Without introducing any physical restriction, it is convenient to assume that the given filter input $x(t)$ is bounded. As in the Wiener theory the past of $x(t)$ is characterized by its Laguerre coefficients. However, it is to be understood that the past of $x(t)$ may be completely characterized by any other set of coefficients associated with an orthogonal expansion of $x(t)$. It can be shown that these coefficients are bounded if $x(t)$ is bounded.

Now consider the function space formed by $s$ Laguerre coefficients. The bounded region over which each Laguerre coefficient range is divided into $n$ intervals and a set of gate functions are defined, as in Eq. 13, for each coefficient. (It is only for convenience in notation that the same number of gate functions are chosen for each Laguerre coefficient.) It was seen above that if an expansion of these coefficients were chosen that partitions this function space into non-overlapping cells and is such that each term in the expansion represents the system output for one cell in the function space, an orthogonal expansion is obtained. To this end consider the expansion $$y(t) = \sum_{i=1}^{n} \sum_{j=1}^{n} \cdots \sum_{h=1}^{n} a_{i,j,\ldots,h} \phi_i(u_1) \phi_j(u_2) \ldots \phi_h(u_s)$$ (24)

in which the $\phi$'s are the gate functions defined in Eq. 13. Examine a typical term in this expansion. The term $$a_{i,j,\ldots,h} \phi_i(u_1) \phi_j(u_2) \ldots \phi_h(u_s)$$ (25)

is non-zero only when the amplitude of $u_1$ is in the interval for which $\phi_i(u_1)$ is unity and the amplitude of $u_2$ is in the interval for which $\phi_j(u_2)$ is unity, and so on for each Laguerre coefficient. The collection of these intervals defines a cell in the function space and thus the term in Eq. 25 is non-zero only when this cell is occupied. Hence the expansion (Eq. 24) divides the function space into non-overlapping cells and each term represents $y$ when the corresponding cell in the function space of the input is occupied. Thus the terms are mutually orthogonal in time for any $x(t)$. As the width of the gate functions is decreased, by increasing $n$, the cells become smaller and $y$ can be made to approximate any continuous function of the $u$'s everywhere with vanishing error.

If $\phi(\alpha)$ represents the function $$\phi_i(u_1) \phi_j(u_2) \ldots \phi_h(u_s)$$

and $A_\alpha$ represents the corresponding coefficient $a_{i,j,\ldots,h}$, Eq. 24 takes the simplified form $$y(t) = \sum_\alpha A\alpha \Phi(\alpha)$$ (26)

This equation is the desired orthogonal representation for nonlinear systems involving storage. The $A_\alpha$'s for the optimum filter will now be determined. As in the case of the no-storage filter (Eq. 17) a weighted mean square error criterion is adopted and the error $$\epsilon = \lim_{T \to \infty} \frac{1}{2T} \int_{-T}^{T} G(t) \left\{ z(t) - \sum_\alpha A_\alpha \Phi(\alpha) \right\}^2 dt$$ (27)

is minimized with respect to the coefficients $A_\alpha$. For the coefficient $A_\beta$ $$\frac{\partial \epsilon}{\partial A_\beta} = \lim_{T \to \infty} \frac{1}{2T} \int_{-T}^{T} -2G(t)\Phi(\beta) \left\{ z(t) - \sum_\alpha A_\alpha \Phi\alpha \right\} dt$$ (28)

For the error to be a minimum with respect to $A\beta$ this equation is set to zero. The result is $$\overline{G(t)\Phi(\beta) \sum_\alpha A_\alpha \Phi(\alpha)} = \overline{z(t)G(t)\Phi(\beta)}$$ (29)

Taking advantage of the time domain orthogonality of the $\Phi$'s this equation reduces to $$A_\beta G(t)\Phi^2(\beta) = z(t)G(t)\Phi(\beta)$$ (30)

Since the $\Phi$'s are products of gate functions they can only take on the values zero or unity, hence Eq. 3 is equivalent to $$A_\beta G(t)\Phi(\beta) = z(t)G(t)\Phi(\beta)$$ (31)

which forms the basis for the experimental procedure for determining the optimum filter coefficients.

Figure 10:
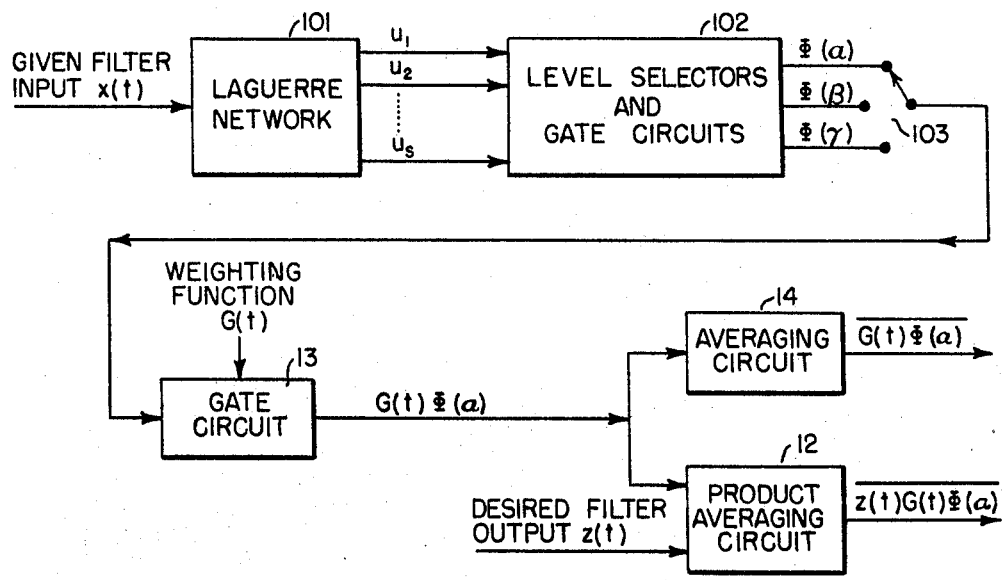
FIG. 10 is a block diagram of apparatus for the determination of optimum nonlinear filters involving storage.

The apparatus for the determination of the optimum filter coefficients is shown in FIG. 10. An ensemble member of $x(t)$ is fed into the Laguerre network 101 and the corresponding ensemble member of $z(t)$ is fed into the product averaging circuit 12. The outputs of the Laguerre network are fed into a no-memory nonlinear circuit consisting of level selectors and gate or coincidence circuits 102. This circuit geerates the $\Phi$'s. Since the $\Phi$'s are either zero or unity, the $\Phi$ selected by switch 103 can be multiplied by $G(t)$ in a simple gate circuit 13. The output of gate circuit 13 is averaged in averaging circuit 14 and also multiplied by $z(t)$ and averaged in product averaging circuit 12 to yield the two quantities necessary to find the optimum coefficients according to Eq. 31.

As the reference numerals indicate, apparatus which follows switch 103 may be the same as the apparatus of FIG. 2 utilized in determining the coefficients which characterize an optimum no-storage system. While the apparatus of FIG. 10 is arranged in a manner whereby the $A$'s are determined one by one, it is apparent that the coefficients associated with each $\Phi$ may be determined simultaneously by providing a gate circuit 13, averaging circuit 14 and product averaging circuit 12 for each $\Phi$.

Figure 11:
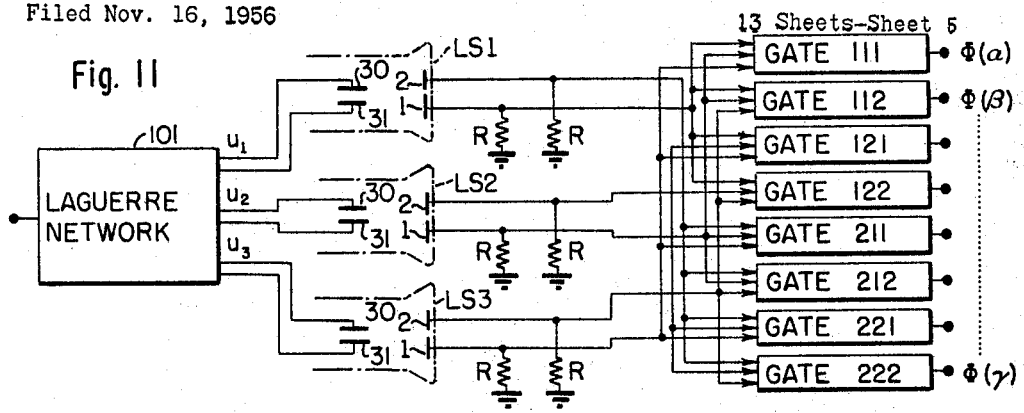
FIG. 11 illustrates an exemplary arrangement of the level selectors and gate circuits of FIG. 10.

Referring to FIG. 11, there is illustrated an arrangement of level selectors and gate circuits 102 for a simple case where there are three Laguerre coefficient signals, respectively $u_1$, $u_2$ and $u_3$, the amplitude of each signal falling into one of two mutually exclusive regions. Each of the latter signals is derived from associated terminal pairs of Laguerre network 101 which is energized by the input signal $x(t)$. The signals $u_1$, $u_2$ and $u_3$ are applied to deflection plates 30 and 31 of respective level selector tubes $LS_1$, $LS_2$ and $LS_3$, each having two target strips, respectively 1 and 2, each corresponding to one of the two regions in which the amplitude of the Laguerre coefficient signals may lie. The level selector tubes may be like the tube of FIG. 6. Thus, a voltage is developed across a resistor R only when its associated target strip is energized as a result of a Laguerre coefficient signal having a contemporary amplitude level such that the electron beam is directed on that strip. Each strip is coupled to one input of four gate circuits whereby each gate circuit is coupled to one target strip of each tube and the combination of inputs to each gate is different from that of the others. Thus, at any one instant of time, the inputs of but one gate are simultaneously energized, thereby providing an output signal from that gate. Each gate is then associated with a particular Φ. The gates are designated in FIG. 11 by a three digit number which is related to the target strips to which the gate input strips are connected. The first, second and third digits designate target strips of tubes $LS_1$, $LS_2$ and $LS_3$ respectively.

Physically, the arrangement just described is seen to sense a sequence of signal amplitude levels and provide an output signal uniquely characteristic of the sequence then sensed. In general, there are as many level selecting devices as Laguerre coefficient signals. If there are $s$ Laguerre coefficient signals and $n$ levels are sensed in each, the number of gates required to characterize every possible sequence of sensed levels is $n^s$.

Figure 12:
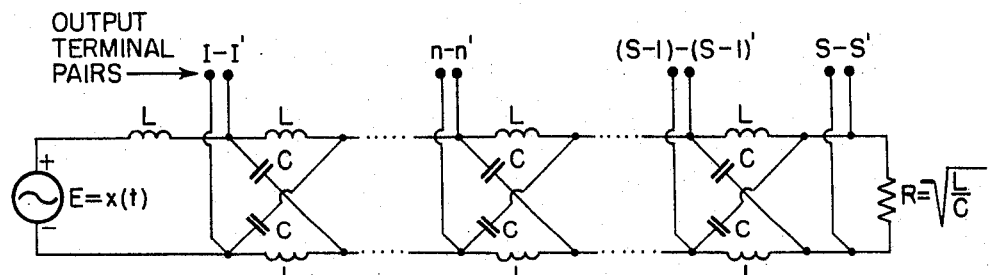
FIG. 12 is a schematic representation of a Laguerre network.

Referring to FIG. 12, there is illustrated a schematic circuit diagram of a suitable Laguerre network. For $R=L=C=1$, the impulse response at the $n$th output terminal is given by Eq. 1 above. Details of synthesis of such networks appear in the above-cited paper of Y. W. Lee.

Figure 13:
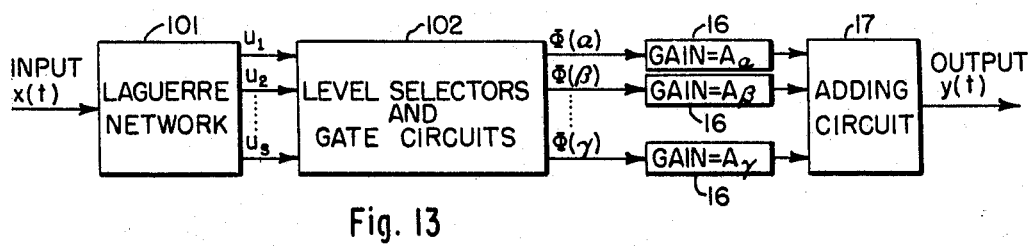
FIG. 13 illustrates a block diagram of apparatus suitable for use as a general optimum nonlinear filter.

Having determined the optimum coefficients, the nonlinear system can be synthesized according to Eq. 26 as indicated in FIG. 13. The input signal $x(t)$ is applied to Laguerre network 101 to provide Laguerre coefficient output signals which energize level selectors and gate circuits 102. Thus far, the apparatus is the same as that of FIG. 10. Each Φ output is connected to a gain imparting means 16. Signals from all the gain imparting means 16 are cumulatively combined in adding circuit 17 to provide the output signal $y(t)$. Note that the apparatus following level selectors and gate circuits 102 is the same as that which follows level selector 15 in the apparatus of FIG. 4. In FIG. 13 it is to be noted that the operation from the outputs of the Laguerre network to the system output $y(t)$ is a no-memory operation. That is $y$ is an instantaneous function of the Laguerre coefficients. Once the A's are known this function is directly specified and any other method of synthesizing no-storage systems for a prescribed operation can be used.

In the procedure described above for determining and synthesizing optimum nonlinear filters the use of gate functions in the expansion of Eq. 24 is especially advantageous. It provides a series representation for the output of the filter in which the time domain orthogonality of the terms of the series is independent of the filter input. Thus, the optimum filter coefficients may be obtained for arbitrary filter inputs without solving simultaneous equations.

Since the gate functions are orthogonal with respect to any weighting factor, optimum filters for weighted mean square error criteria can be determined.

In most series representations of a function a difficulty is encountered that over some region of the independent variable small differences of two or more large terms are necessary to represent the desired function. In the gate function expansion (Eq. 26) only one term has a non-zero value at any one instant of time; so this difficulty does not arise.

In general, expansions that represent nonlinear functions involve the use of multipliers in the experimental setup. (For example, if a Taylor series or Hermite function expansion is used.) The use of gate functions replaces the multipliers by simpler level selectors and coincidence circuits.

An error weighting function $G(t)$ appears in the error expressions Eq. 17 and Eq. 27 for the no-storage and the general filter respectively. The choice of this weighting function will, of course, depend upon the particular problem. It may be chosen as a function of the past, present, and/or future of $x(t)$ and $z(t)$ and can be generated in the laboratory from the recorded ensemble members of $x(t)$ and $z(t)$. If $G(t)$ is a constant then the mean-square error criterion results. Other choices for $G(t)$ enable filters to be designed for different error criteria and to introduce a priori information into the filter design.

One choice of $G(t)$ was illustrated in the example of FIG. 7. The signal component $z(t)$ of the filter input $x(t)$ consisted of pulses occuring periodically. $x(t)$ was $z(t)$ corrupted in some way by noise as shown in FIG. 7A. It was assumed that the time when the signal pulses occurred was known. The optimum mean-square filter, of a given class of filters, for recovering $z(t)$ from $x(t)$ is the one for which the time average of $$[z(t)-y(t)]^2$$

is a minimum for all filters of the class. (In this expression $y(t)$ is the filter output.) Actually, however, it was of interest to minimize the error between $z(t)$ and $y(t)$ only during the time when signal pulses were present. By choosing a $G(t)$ that is a constant during the time intervals when signal pulses occur and zero at all other times (FIG. 7C) just such a filter was designed. In general, if both these filters have the same degree of freedom (i.e., the same number of Laguerre coefficients and gate functions) the performance of the one designed with the weighting function mentioned above will be superior to that of the mean-square filter since all the freedom of the former is used to minimize the error over the time intervals of interest. Thus through $G(t)$ a priori information has been introduced (about the periodic occurrence of the signal pulses) into the filter design to obtain a better filter.

In other problems it may be desirable to choose $G(t)$ to be a function of the magnitude of the difference between the present values of $x(t)$ and $z(t)$ so that the freedom of the filter is used to do a better job, on the average, when $|x(t)-z(t)|$ lies in certain ranges, at the expense of its performance when this difference lies in other ranges. For example, it might be desired that the filter output be as close as possible to the desired output, on the average, when the difference between the input and desired output is small and, when this difference is large, less significance would be attached to the filter output. In such a case $G(t)$ could be $|x(t)-z(t)|^{-n}$. For large $n$ this $G(t)$ weights small errors between $x(t)$ and $z(t)$ much more heavily than large errors.

The choices of $G(t)$ are limited only by the ingenuity of the designer to best make use of the data at his disposal. By precisely defining the object of the particular filter problem and carefully studying the nature of the problem he may often be able to choose a $G(t)$ that yields a far better filter than the mean-square filter.

An expression shall now be determined for the minimum error of nonlinear filters that can be evaluated from a knowledge of the input and desired output time functions. The general expression for the error between the desired output and the actual nonlinear system output is given by Eq. 27 which is repeated below for convenience.

$$\epsilon = \lim_{T \to \infty} \frac{1}{2T} \int_{-T}^{T} G(t) \left\{ z(t) - \sum_{\alpha} A_\alpha \Phi(\alpha) \right\}^2 dt \quad (27)$$

It was seen (Eq. 28) that for this error to be a minimum with respect to the $A_\alpha$'s $$\lim_{T\to\infty} \frac{1}{2T}\int_{-T}^{T} G(t)\Phi(\beta)\left[z(t)-\sum_\alpha A_\alpha \Phi(\alpha)\right]dt=0 \quad (32)$$

for all $\beta$ and hence $$\lim_{T\to\infty} \frac{1}{2T}\int_{-T}^{T} \sum_\beta A_\beta\Phi(\beta)G(t)\left[z(t)-\sum_\alpha A_\alpha \Phi(\alpha)\right]dt=0 \quad (33)$$

$$\epsilon = \overline{G(t)z(t)\left[z(t)-\sum_\alpha A_\alpha \Phi(\alpha)\right]}$$
$$-\overline{\sum_\beta A_\beta\Phi(\beta)G(t)\left[z(t)-\sum_\alpha A_\alpha \Phi(\alpha)\right]} \quad (34)$$

But from Eq. 31 it is seen that the term on the right side of Eq. 34 is zero for the optimum filter. Using this fact and inserting the expression for the optimum filter coefficients (Eq. 31 into Eq. 34) the desired expression for the minimum error is $$\epsilon_{min.} = \overline{z^2(t)G(t)} - \sum_\alpha \frac{\overline{z(t)G(t)\Phi(\alpha)}^2}{\overline{G(t)\Phi(\alpha)}} \quad (35)$$

This equation expresses the error of the optimum system, having a given number of Laguerre cofficients and gate functions, in terms of the filter input and desired output time functions. If, in Eq. 35, $\Phi(\alpha)$ is changed to $\Phi_j(x)$ and the summation is taken over $j$, the minimum error expression for no-storage filters is obtained.

With the addition of a squaring device at the output of the product averaging circuit in FIG. 10, the quantities necessary to determine $\epsilon_{min}$ can be evaluated, and $\epsilon_{min}$ can thus be found without first constructing the optimum filter. Similar apparatus could be built to automatically evaluate $\epsilon_{min}$ upon application of $x(t)$ and $z(t)$. For those filters having a sufficiently small number of $A_\alpha$'s (for example, no-storage filters and simple filters involving one or two Laguerre coefficients) all the terms in the sum (Eq. 35) could be evaluated simultaneously and added. This would give a rapid way of finding $\epsilon_{min}$. When the number of cofficients becomes very large then, to save equipment at the expense of time, the terms in the sum could be evaluated sequentially. This apparatus would be useful in decoding a priori the complexity of the nonlinear filter to use for a particular problem. It would also help to decide whether or not it is worthwhile to construct a complicated nonlinear filter to replace a simple linear or nonlinear one. Since such apparatus would make use of the same measurements that determine the $A_\alpha$'s, if after measuring its error it was decided to build the filter, it could be constructed without further measurements.

A method will now be discussed for determining a non-linear filter whose output is the most probable value of the desired output given the past of the input. It is shown that such a filter can be determined with a simple modifictaion of the apparatus (FIG. 10) used to determine optimum filters for a weighted mean square criterion.

As in the case of the weighted mean square criterion, let the form of the nonlinear operator be that of Eq. 26. At any instant the system output is equal to the cofficient of the term that corresponds to the occupied cell in the function space of the past of the input. Hence, for the maximum probability criterion each coefficient $A_\alpha$ should be chosen to be equal to the most probable value of the desired output given that the $\alpha$th cell is occupied.

Figure 14:
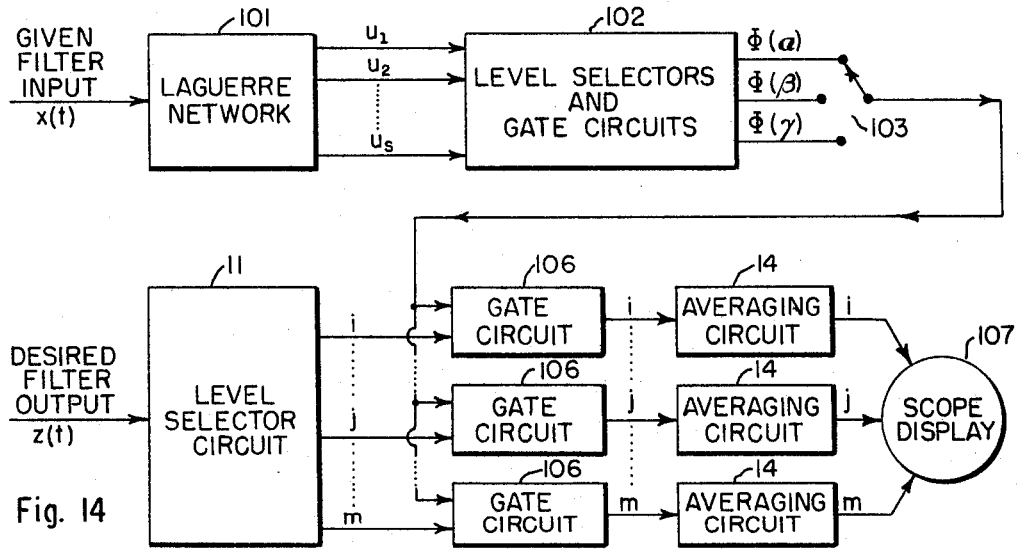
FIG. 14 is a block diagram of apparatus for determining optimum filters according to a maximum probability criterion.

Apparatus for experimentally determining maximum probability filters is shown in FIG. 14. The desired output $z(t)$ is fed into a level selector circuit 11, which may be the level selector circuit of FIG. 2. If the amplitude of $z(t)$ is in the amplitude interval corresponding to the level $z_j$ then the output at the $j$th terminal of level selector 11 is unity. Otherwise this output is zero. The outputs of level selector circuit 11, along with the output of the $\Phi$ generator 102, which is energized by Laguerre network 101, are fed into gate circuits 106. The output of the $j$th gate circuit is unity when $z(t)$ is in the amplitude interval about $z_j$ and, simultaneously, the $\alpha$th cell in the function space is occupied. It is zero at all other times. The time average of this output signal is the probability of the simultaneous occurrence of these two events. It is convenient to write this probability as $P(z_j, \alpha$th cell). But $$P(z_j, \alpha\text{th cell}) = P(z_j|\alpha\text{th cell}) \, P(\alpha\text{th cell}) \quad (36)$$

so that the output of the $j$th averaging circuit 14 is proportional to $P(z_j|\alpha$th cell). If terminal $k$ has the largest output of all the $m$ terminals then $z_k$ is the most probable value of $z(t)$ given that the $\alpha$th cell is occupied. (This of course assumes that $m$ is large enough so that the amplitude interval associated with $z_j$ is very small compared to the maximum amplitude of $z(t)$.) Hence the optimum $A\alpha$ for the maximum probability criterion is equal to $z_k$.

For convenience in rapidly determining which output of the averaging circuits is largest, the outputs can be displayed on an oscilloscope 107 as indicated in FIG. 14. Once the $A$'s are determined the filter can be synthesized in the standard form shown in FIG. 13.

As the complexity of the filter (i.e., more Laguerre coefficients are used to characterize the past and more gate functions are used for each coefficient) is increased the number of $A\alpha$'s necessary to specify the filter grows very rapidly. In particular, if $s$ Laguerre coefficients and $n$ gate functions are used for each coefficient, there are $n^s$ $A_\alpha$'s to evaluate. After evaluating a large number of $A_\alpha$'s, it would be desirable to have some guarantee that the filter would perform at least as well as, say, a linear filter or a simple nonlinear filter that can be designed with less effort. Methods of obtaining this guarantee will now be described. The series representation for the general system of this one coefficient class is $$y(t) = \sum_{i=1}^{n} a_i \phi_i(u_i) \quad (37)$$

It can be shown that the class of filters using $s$ Laguerre coefficients includes all classes having less than $s$ coefficients. This property is independent of the nature of the $u$'s; they may be Laguerre coefficients of the past of $x(t)$ or they may be obtained from $x(t)$ by any linear or nonlinear operation.

Figure 15:
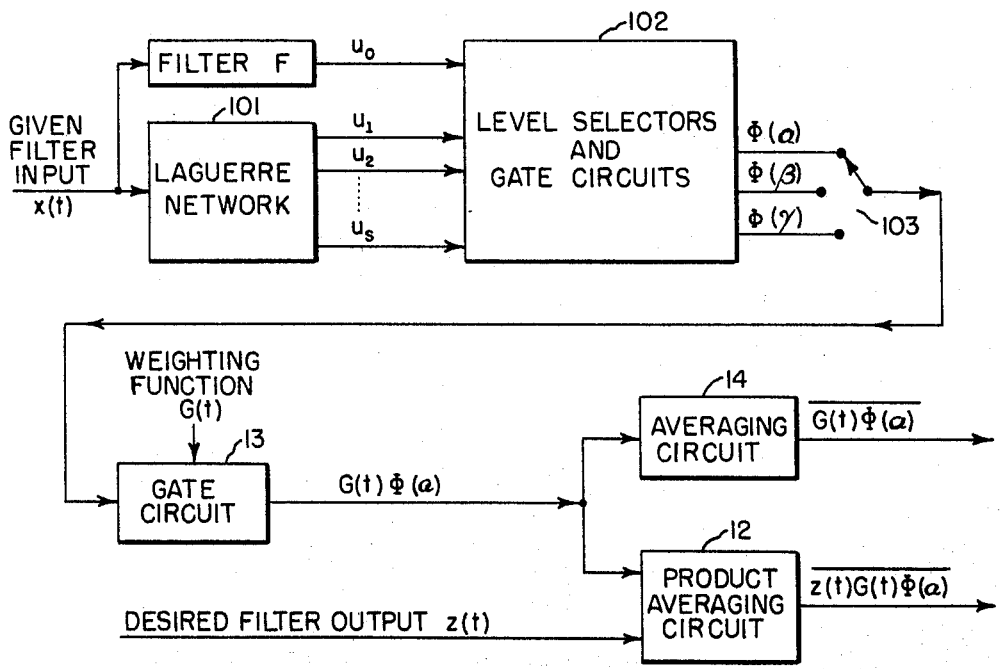
FIG. 15 is a block diagram of apparatus for determining a filter which improves the performance of a given filter.

This property is now used to determine a filter whose performance is equal or superior, with respect to a weighted mean square criterion, to a given filter F. F may be linear or nonlinear. The Laguerre coefficients are augmented with the output, $u_0$, of the given filter F, as shown in FIG. 15. Then, by the property demonstrated above, the filter whose output is expressible as $$y(t) = \sum_{i=1}^{n} a_i \Phi_i(u_0) \quad (38)$$

is a member of the class of filters which has $s$ Laguerre coefficients augmented by $u_0$. If the number $n$ of gate functions associated with the variable $u_0$ is sufficiently large, then to any degree of approximation Eq. 38 represents the class of filters shown in FIG. 16 consisting of F cascaded with a no-storage filter. Since the transfer characteristic of the no-storage system can be linear, the latter class certainly contains the filter F. Hence the filter determined by the procedure utilizing the apparatus of FIG. 15, for any $s$, performs at least as well as the given filter F and in fact, at least as well as F cascaded with any no-storage filter.

The apparatus of FIG. 15 is seen to comprise the apparatus of FIG. 10 with the filter F responding to the input signal by providing an additional output signal designated $u_0$.

Having determined the $A_\alpha$'s of the desired filter as indicated in FIG. 15 the filter synthesis is accomplished as shown in FIG. 17. The apparatus of FIG. 17 is seen to comprise the apparatus of FIG. 13 with the filter F responding to the input signal by providing an additional output signal designated $u_o$.

Another method of determining filters to improve the performance of given filters will be described. Let the output of the given filter F be $u_0(t)$ when its input is $x(t)$. The object is to improve (with respect to a weighted mean square criterion) the performance of F by paralleling it with a filter which will be determined. The $A_\alpha$'s of the desired filter are those that minimize the error $$\epsilon \lim_{T \to \infty} \frac{1}{2T} \int_{-T}^{T} G(t) \left\{ z(t) - \left[ u_o(t) + \sum_\alpha A_\alpha \Phi(\alpha) \right] \right\}^2 dt \quad (39)$$

This expression is seen to be equivalent to $$\epsilon \lim_{T \to \infty} \frac{1}{2T} \int_{-T}^{T} G(t) \left\{ [z(t) - u_o(t)] - \sum_\alpha A_\alpha \Phi(\alpha) \right\}^2 dt \quad (40)$$

Comparing Eq. 40 with Eq. 27 it is seen that the optimum A's are determined by an experimental procedure like that utilizing the apparatus of FIG. 10 with $z(t)$ replaced by $z(t) - u_0(t)$. The latter quantity is easily obtained by applying $x(t)$ to the given filter F and subtracting the output of F from $z(t)$ in subtracting circuit 108, as shown in FIG. 18. The apparatus of FIG. 18 is seen to comprise the apparatus of FIG. 10 with a filter F energized by the input signal $x(t)$ and providing an output signal $u_0(t)$ which is applied to a subtracting circuit 18. Instead of the desired signal $z(t)$ being applied directly to product averaging circuit 12, the latter signal is applied to subtracting circuit 18 and the output signal of the latter, which is the difference signal $z(t) - u_0(t)$, is applied to product averaging circuit 12. The parallel combination of F and the filter determined as just described will always perform at least as well as F, since that filter which has no transmission from input to output is a member of the class of filters considered. In other words, the solution in which all the $A_\alpha$'s are equal to zero is a possible solution of Eqs. 38 and 39.

The second method described for improving the performance of given filters offers the advantage of not having gate functions associated with the output time function of the given filter; therefore improvements can be made on the performance of F by very simple systems involving as little as one Laguerre coefficient and hence having a relatively small number of $A_\alpha$'s to evaluate. The first method does require a gate function expansion of the output of the given filter F but it has the advantage of ensuring that the performance of the resultant filter will always be at least as good as the performance of F cascaded with any no-storage system. In either method, the resultant overall filter approaches the most general filter (of the class considered herein) as the number of Laguerre coefficients and gate functions is increased.

Still another design procedure involves the determination of that filter which when cascaded with F (with F as the first member of the combination) yields an overall filter having a performance superior to that of F alone. In order to ensure that the resultant overall filter performs at least as well as F the Laguerre coefficients of the cascaded filter could be augmented by a variable $u_0$ that is equal to the input of the Laguerre network. While this procedure gives a filter that is at least as good as F, there is no assurance that as the number of Laguerre coefficients and Hermite functions is increased the overall filter will approach the most general filter.

Having discussed optimum filtering, utilization of the inventive concepts for multiple prediction will be discussed. The problem of multiple prediction is that of predicting a time series from a knowledge of related time series. An example is the prediction of weather at one location from a knowledge of the past of the weather at that and other surrrounding locations.

The filter theory developed above may be extended to the problem of multiple prediction. Let $z(t+\alpha)$ be the function that it is desired to predict and let $x_1(t)$ through $x_p(t)$ be the input functions whose past is operated upon to form the prediction. The set of functions $x_1(t)$ through $x_p(t)$ may, indeed, include $z(t)$. The past of each input will be characterized by a set of Laguerre coefficients. Let $u_{1j}, u_{2j}, \ldots, u_{sj}$ be the Laguerre coefficients of $x_j(t)$. It is helpful to think of a function space that encompasses the past of all $p$ of the input time functions. That is, the basis of this space is formed by the Laguerre functions associated with each input. A point in this space then represents the past of all the inputs and hence the multiple prediction problem is just the problem of mapping this space onto a line (corresponding to the amplitude of the system output) in a manner that is optimum with respect to some error criterion. But this is the same problem encountered in the single input filter problem and it is recognized that the only difference between the single and multiple input problem is in the number of dimensions of the function space. The solution of the multiple prediction problem directly parallels that of the filter problem above.

Let $y(t)$ be a gate function expansion of the Laguerre coefficients of all the inputs $x_1(t)$ through $x_p(t)$. The expansion is $$y(t) = \sum_{i_1} \sum_{j_1} \ldots \sum_{h_1} \ldots \sum_{i_p} \sum_{j_p} \ldots \sum_{h_p} a_{i_1, j_1, \ldots, h_1}$$
$$\ldots, i_p, j_p, \ldots h_p \times \phi_{i_1}(u_{11}) \phi_{j_1}(u_{21}) \ldots \phi_{h_1}(u_{s1}) \ldots$$
$$\Phi_{i_p}(u_{1p}) \phi_{j_p}(u_{2p}) \ldots \phi_{h_p}(u_{sp}) \quad (41)$$

If there is associated an $\Omega(\alpha)$ with each product of $\phi$'s in Eq. 41 and $A_\alpha$ is the corresponding coefficient $a_{i_1, j_1, \ldots, h_1, \ldots, i_p, j_p, \ldots, h_p}$, Eq. 41 takes the simplified form $$y(t) = \sum_\alpha A_\alpha \Omega(\alpha) \quad (42)$$

Just as in the filter problem, a weighted mean square error criterion is adopted and the error miminized.

$$\epsilon \lim_{T \to \infty} \frac{1}{2T} \int_{-T}^{T} G(t) \left\{ z(t+\alpha) - \sum_\alpha A_\alpha \Omega(\alpha) \right\}^2 dt \quad (43)$$

This equation is seen to have the same form as Eq. 27 for the filter problem. The solution for the optimum A's proceeds as in the filter problem with result $$A_\alpha \overline{G(t) \Omega(\alpha)} = \overline{z(t+\alpha) G(t) \Omega(\alpha)} \quad (44)$$

Figure 19:
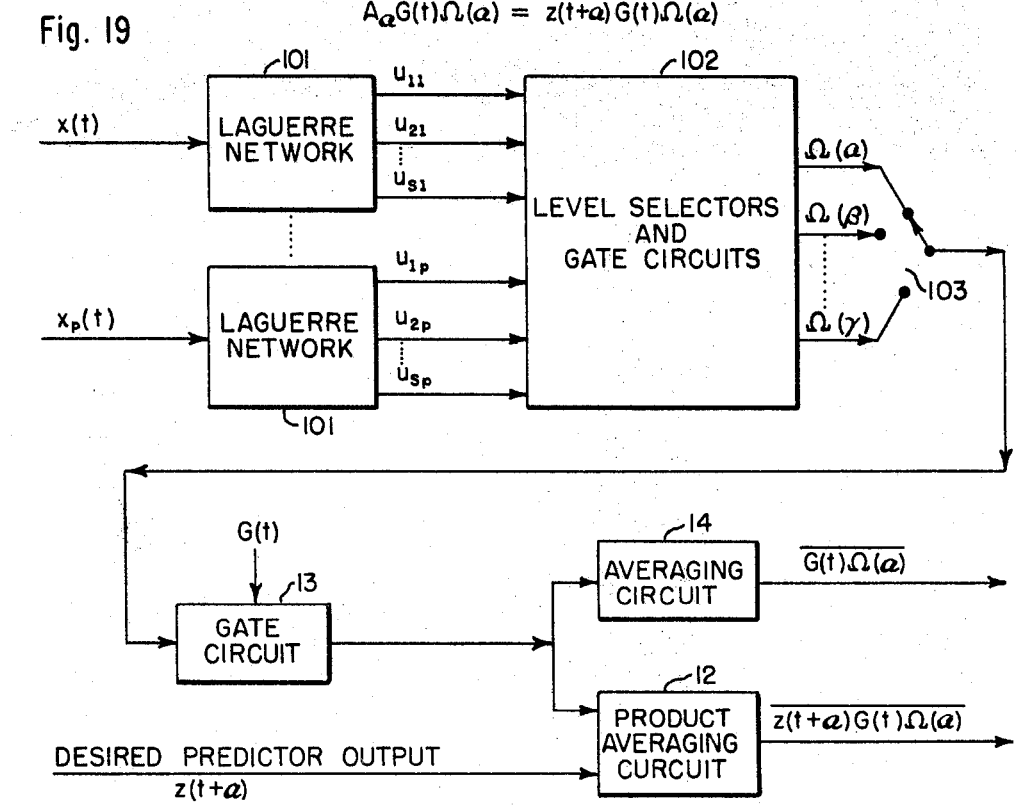
FIG. 19 is a block diagram of apparatus for determining the optimum multiple predictor.
Figure 20:
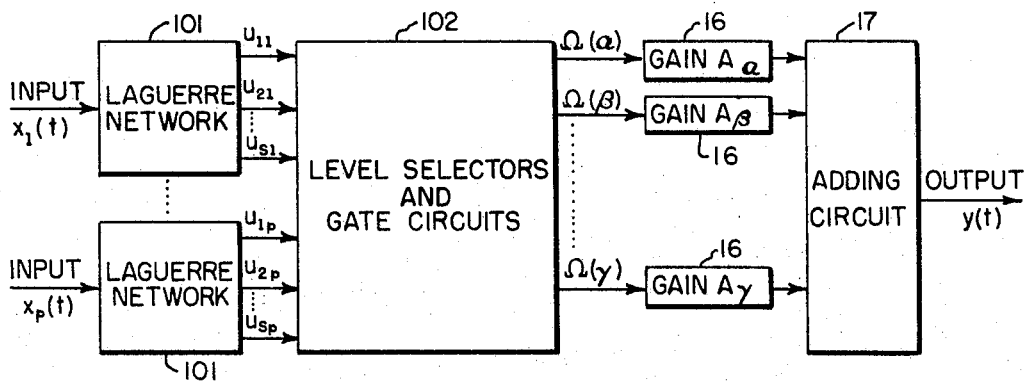
FIG. 20 is a block diagram of apparatus suitable for use as an optimum multiple predictor.

The apparatus for experimentally determining the A's according to this equation is shown in FIG. 19. This apparatus is seen to comprise the apparatus of FIG. 10 with the exception that there is a Laguerre network 101 associated with each input signal. Having determined the coefficients, the predictor can be synthesized in accordance with Eq. 42 as shown in FIG. 20. This apparatus is seen to comprise the apparatus of FIG. 13 with the exception that there is a Laguerre network 101 associated with each input signal.

Once the coefficients for an optimum filter have been determined, the filter can, as seen above, be synthesized as shown in FIG. 13. Much simpler synthesis procedures (apparatuswise) exist however if the filter is linear or belongs to a particular sub-class of nonlinear systems. Hence, it is desirable to have a means of detecting linear and simple nonlinear systems directly from a knowledge of their characterizing coefficients. A simple procedure for testing the coefficients ($A_\alpha$'s) will be developed that detects such systems and directly yields a convenient synthesis of them.

Figure 21:
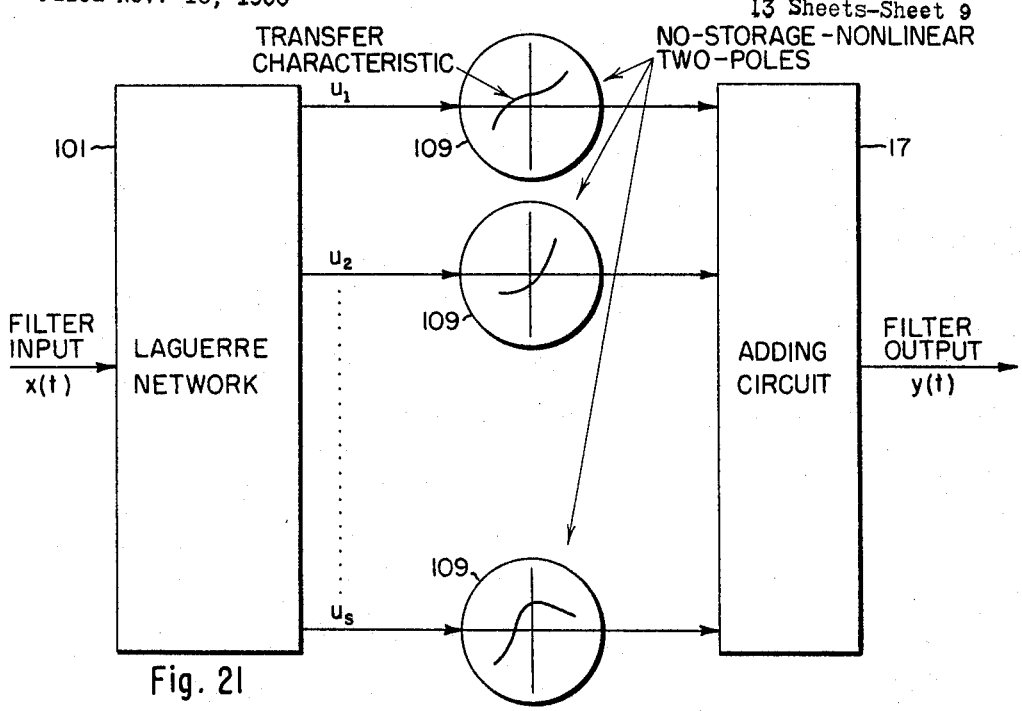
FIG. 21 is a block diagram of the class of nonlinear systems having no cross products of the Laguerre coefficients.

The class of simple nonlinear systems considered is shown in FIG. 21. It consists of a Laguerre network and no-storage nonlinear two-poles (no-storage nonlinear systems with one input and one output terminal). Each output of the Laguerre network 101 is fed into a no-storage two-pole circuit 109 and the outputs of these circuits are added in adding circuit 17 to form the system output $y(t)$. In this class of systems the nonlinear circuits introduce no cross-talk among the Laguerre coefficients (i.e., there are no cross products of Laguerre coefficients introduced). This class of systems is clearly a sub-class of the general class considered above. When the transfer characteristics of all the two-poles are straight lines the system is linear. In particular, it is an sth order Laguerre network in which the gain factors associated with the Laguerre network outputs are equal to the slopes of the respective linear two-pole transfer characteristics.

The synthesis of nonlinear systems belonging to this sub-class is relatively simple, apparatuswise. The nonlinear two-poles may be synthesized by piecewise linear approximations using diodes and resistors. If the system is linear the synthesis takes the form of a Laguerre network whose outputs are properly amplified or attenuated before being added to form the system output. In this linear case it may be desirable to measure the transfer function of the optimum system and then use available synthesis techniques to obtain alternate realizations of this transfer function using linear passive circuits.

From the characterizing coefficients $A_a$ of a nonlinear system, a test will be described for determining if the system belongs to the class shown in FIG. 21 and, if it does, what the transfer characteristics of the nonlinear two-poles are.

From the function space point of view the sub-class of nonlinear systems shown in FIG. 21 consists of all those systems for which the system output corresponding to each cell in function space is equal to the sum of the outputs corresponding to the coordinates (the Laguerre coefficients) of the cell. That is, since there is no cross-talk, each coordinate contributes to the output an amount that is independent of the other coordinates and hence the system output corresponding to any cell is the sum of the outputs corresponding to the coordinates of the cell. (Cells are spoken of rather than points in function space because the nonlinear system is represented by a gate function expansion which quantizes the function space. In this connection it should also be realized that a stepwise approximation to the two-pole characteristics of FIG. 21 is obtained rather than the continuous curves.) Hence Eq. 24, which represents a general gate function expansion of the Laguerre coefficients, takes on the form $$y(t) = \sum_{i=1}^{n} b_{i1}\phi_i(u_2) = \sum_{j=1}^{n} b_{j2}\phi_j(u_2) + \ldots + \sum_{h=1}^{n} b_{hs}\phi_h(u_s)$$
(45)

for the sub-class of systems of FIG. 21. Each sum in the equation yields the transfer characteristic of the nonlinear two-pole that is associated with the Laguerre coefficient indicated in that sum. For convenience in comparing this expansion with that of Eq. 24 the latter is repeated below.

$$y(t) = \sum_{i=1}^{n} \sum_{j=1}^{n} \cdots \sum_{h=1}^{n} a_{i,j,\ldots,h}\phi_i(u_1)\phi_j(u_2) \ldots \phi_a(u_s)$$
(24)

In the experimental procedure described above for finding optimum filters (FIG. 10) the $A_a$ or equivalently the $a_{i, j, \ldots, h}$ of the filter are determined. If and only if these $a$'s are such that Eq. 24 can be expressed in the form of Eq. 45, the system can be synthesized according to Eq. 45 in the form shown in FIG. 21. Consider how the $a$'s must be related to the $b$'s if these two equations are to be equivalent. By the two equations being equivalent it is meant that they yield the same value for every cell in function space; hence $$a_{i, j, \ldots, h} = b_{i1} + b_{j2} + \ldots + b_{hs} \text{ for all } i, j, \ldots, h$$ (46)

This relation represents a set of $n^s$ simultaneous equations that the $a$'s must satisfy. A simple way of finding whether, for any given set of $a$'s, this set of equations is satisfied will now be developed.

It is convenient to establish an order for the evaluation of the $a$'s (and thus the $A_a$'s). It is assumed henceforth that these coefficients are evaluated as follows. The first coefficient evaluated is that for which $i=j= \ldots =h=1$. The next $n-1$ coefficients are obtained by letting $h$ run from 2 to $n$ while holding all other indices equal to unity. To obtain the $(n+1)$th coefficient, the index preceding $h$ is set to 2 and all the other indices are allowed to be unity. The following $n-1$ coefficients are obtained by again letting $h$ range from 2 to $n$. This procedure is continued until the index $i$ has gone through all its $n$ values, at which point all the $a$'s will have been evaluated. This order of evaluating the coefficients is best illustrated by a simple example. Consider the coefficients ($a$'s) of a nonlinear system having three Laguerre coefficients and two gate functions for each coefficient. That is, $s=3$ and $n=2$. There are $n^s=8$ coefficients $a_{i, j, k}$ to evaluate. According to the above procedure these coefficients are evaluated in the following order:

(1) $a_{111}$       (5) $a_{211}$
(2) $a_{112}$       (6) $a_{212}$
(3) $a_{121}$       (7) $a_{221}$
(4) $a_{122}$       (8) $a_{222}$

A study of the order in this simple example is sufficient to establish the order of evaluating the $a$'s for any $s$ and $n$.

The subscript associated with each constant $a$ has the following significance. The digit place denotes a particular Laguerre coefficient $u_s$ and the digit value denotes the corresponding one of the $n$ levels associated with that Laguerre coefficient. Thus, $a_{213}$ corresponds to $u_1$ in level 2, $u_2$ in level 1 and $u_3$ in level 3.

The subscript associated with each $b$ has the following significance. The second digit denotes a particular Laguerre coefficient $u_s$ in level 3.

Now think of the coefficients $a_{i,j, \ldots, h}$, arranged in the order of evaluation, as components of a vector A and the corresponding coefficients $b_{11}, b_{21}, \ldots, b_{n1}, b_{12}, b_{22}, \ldots b_{n2}, \ldots, b_{1s}, b_{2s}, \ldots, b_{ns}$, arranged as shown, as components of a vector B. Then the set of equations represented by Eq. 46 can be written in matrix form as follows $$A] = [M] \, B]$$ (47)

where [M] is the matrix that operates on the vector B to give the vector A. The form of the matrix [M] will now be determined. In order to illustrate the form of this matrix, a nonlinear system will be considered for which $s=n=3$ and for which Eq. 46 is assumed to hold. From the results of this example the form of [M] can be visualized for any $s$ and $n$. The equations indicated in Eq. 46 are tabulated for this example, in Table 1. The $b$'s are written at the top of the columns so that the form of the matrix [M] is evident. The actual equations are obtained by dropping the $b$'s down beside the unity coefficients. (All the blank spaces in the matrix represent zero matrix coefficients.) Thus the first equations reads $$a_{111} = b_{11} + b_{12} + b_{13}$$ (48)

It is seen that the matrix [M] is composed entirely of zeros and ones. Also note the very regular pattern of the unity coefficients. A study of this pattern will enable its form to be visualized for any $s$ and $n$.

A test for the $a$'s that enables the set of Equations 46 to be directly found or equivalently Eq. 47 to be satisfied will be stated. Its validity (for $s+n=3$) may be checked by analyzing it in terms of the matrix of Table 1.

(1) Starting with $a_{1, 1, \ldots, 1}$, plot the $a$'s (consecutively in the order in which they are evaluated) in groups of $n$ at unit intervals along a linear scale. That is, form a set of $n^{(s-1)}$ graphs, each of which contains $n$ $a$'s plotted at equal intervals along a line. This set of graphs is called set 1.

(2) Take the first "$a$" of each graph above, starting with $a_{1, 1, \ldots, 1}$, and plot these consecutively in groups of $n$ at unit intervals on a linear scale. Call this set of graphs set 2.

(3) Repeat the procedure of step 2 unit $s$ sets of graphs are obtained. The sth set will consist of only one graph.

From a study of the general form of [M] it can be seen that if for a given set of $a$'s there exists a set of $b$'s such that Eq. 47 is satisfied, then all

TABLE 1

| | $b_{11}$ | $b_{21}$ | $b_{31}$ | $b_{12}$ | $b_{22}$ | $b_{32}$ | $b_{13}$ | $b_{23}$ | $b_{33}$ |
|---|---|---|---|---|---|---|---|---|---|
| $a_{111}=$ | 1 | | | 1 | | | 1 | | |
| $a_{112}=$ | 1 | | | 1 | | | | 1 | |
| $a_{113}=$ | 1 | | | 1 | | | | | 1 |
| $a_{121}=$ | 1 | | | | 1 | | 1 | | |
| $a_{122}=$ | 1 | | | | 1 | | | 1 | |
| $a_{123}=$ | 1 | | | | 1 | | | | 1 |
| $a_{131}=$ | 1 | | | | | 1 | 1 | | |
| $a_{132}=$ | 1 | | | | | 1 | | 1 | |
| $a_{133}=$ | 1 | | | | | 1 | | | 1 |
| $a_{211}=$ | | 1 | | 1 | | | 1 | | |
| $a_{212}=$ | | 1 | | 1 | | | | 1 | |
| $a_{213}=$ | | 1 | | 1 | | | | | 1 |
| $a_{221}=$ | | 1 | | | 1 | | 1 | | |
| $a_{222}=$ | | 1 | | | 1 | | | 1 | |
| $a_{223}=$ | | 1 | | | 1 | | | | 1 |
| $a_{231}=$ | | 1 | | | | 1 | 1 | | |
| $a_{232}=$ | | 1 | | | | 1 | | 1 | |
| $a_{233}=$ | | 1 | | | | 1 | | | 1 |
| $a_{311}=$ | | | 1 | 1 | | | 1 | | |
| $a_{312}=$ | | | 1 | 1 | | | | 1 | |
| $a_{313}=$ | | | 1 | 1 | | | | | 1 |
| $a_{321}=$ | | | 1 | | 1 | | 1 | | |
| $a_{322}=$ | | | 1 | | 1 | | | 1 | |
| $a_{323}=$ | | | 1 | | 1 | | | | 1 |
| $a_{331}=$ | | | 1 | | | 1 | 1 | | |
| $a_{332}=$ | | | 1 | | | 1 | | 1 | |
| $a_{333}=$ | | | 1 | | | 1 | | | 1 | the graphs of these $a$'s within each set of graphs will be identical except for a possible vertical translation. Further, the converse holds; that is, if all the graphs of the $a$'s within each set of graphs are identical, within a vertical translation, then there exists a set of $b$'s such that Eq. 47 is satisfied.

Hence, if there exists a system governed by Eq. 45 that is equivalent to a system governed by Eq. 24 for a given set of $a$'s, then all the graphs of the $a$'s, within each set of graphs, must be the same except for a possible vertical translation. And, conversely, if the above test is applied to the $a$'s of a system and it is found that all the graphs within each set are the same within vertical translation, the system having these $a$'s can be synthesized in the form shown in FIG. 21.

Assuming that the $a$'s have been tested as described above and that they correspond to a system of the type shown in FIG. 21, the synthesis of this system will be described. It is desired to find the transfer characteristics of the no-storage two poles. One way to do this is to solve Eq. 47 for the $b$'s, which by Eq. 45, directly determine the no-storage transfer characteristics. As a consequence of the special form of [M] this solution is readily accomplished. However, a simpler method of synthesizing the desired system makes direct use of the graphs that are drawn when the $a$'s are tested. Relative to the $a$'s in Table 1 examine the sets of graphs defined in the test procedure. From inspection of Table 1 it is readily seen that all the graphs of set 1 are idential to (except for a possible vertical translation) the graph that would be obtained if $b_{13}$, $b_{23}$, and $b_{33}$ were plotted, in this order, at unit intervals on the same linear scale. Similarly it is seen that the graphs of set 2 are the same (within a vertical translation) as the graph that would be obtained by plotting $b_{12}$, $b_{22}$, and $b_{32}$. And finally the graphs of set 3 correspond, in a similar manner, to the graph that would be obtained by plotting $b_{11}$, $b_{21}$ and $b_{31}$. But notice (Eq. 45 for $n=s=3$) that $b_{13}$, $b_{23}$ and $b_{33}$ are just the heights of the steps in the stepwise approximation to the two-pole characteristic associated with $u_3$. Similarly $b_{12}$, $b_{22}$ and $b_{32}$ determine the transfer characteristic of the nonlinear two-pole whose input is $u_2$. And finally $b_{11}$, $b_{21}$ and $b_{31}$ determine the two-pole characteristic associated with $u_1$. Hence the graphs that are made when the $a$'s are tested directly determine the desired two-pole transfer characteristics, within a vertical translation. In the synthesized nonlinear system (FIG. 21) the vertical displacement of the two-pole transfer characteristics affects only the D.C. level of the output. When this level is of interest it can be reestablished by a series battery at the system output as will be shown in examples that follow.

From the above discussion the case of arbitrary $s$ and $n$ may be readily generalized as follows: Except for a vertical translation, the graph of set 1 determines the transfer characteristic of the two-pole associated with $u_s$. The graph of set 2 determines the transfer characteristic of the two-pole associated with $u_{s-1}$ and so on down to the graph of set $s$ which determines the transfer characteristic of the two-pole associated with $u_1$.

Suppose that the coefficients of an optimum filter of the class $s=n=3$ have been determined to have the values given below:

| | | |
|---|---|---|
| $a_{111}=1$ | $a_{211}=0$ | $a_{311}=2$ |
| $a_{112}=4$ | $a_{212}=3$ | $a_{312}=5$ |
| $a_{113}=3$ | $a_{213}=2$ | $a_{313}=4$ |
| $a_{121}=2$ | $a_{221}=1$ | $a_{321}=3$ |
| $a_{122}=5$ | $a_{222}=4$ | $a_{322}=6$ |
| $a_{123}=4$ | $a_{223}=3$ | $a_{323}=5$ |
| $a_{131}=5$ | $a_{231}=4$ | $a_{331}=6$ |
| $a_{132}=8$ | $a_{232}=7$ | $a_{332}=9$ |
| $a_{133}=7$ | $a_{233}=6$ | $a_{333}=8$ |

These coefficients will be tested to see if the corresponding system can be synthesized in the form shown in FIG. 21. The coefficients, plotted according to the test procedure described above, are shown in FIG. 22. In order to make the form of each graph stand out, consecutive points corresponding to the $a$'s have been joined by straight lines. It is seen here that all the graphs within each set of graphs are identical within a vertical translation. Hence the system can be synthesized in the form shown in FIG. 21.

Figure 23:
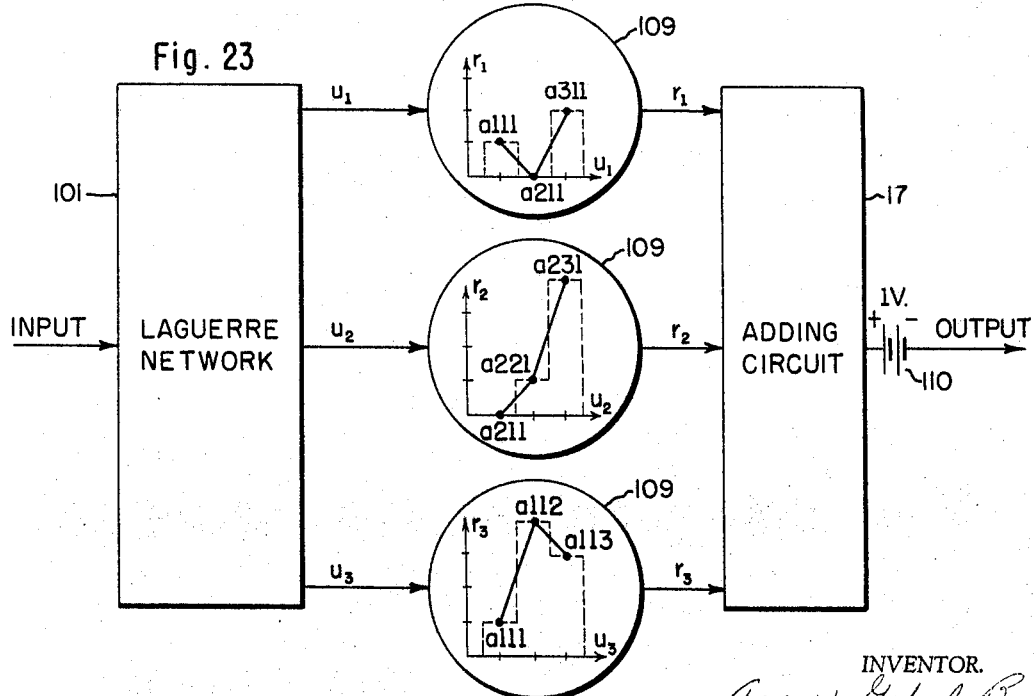
FIG. 23 is a block diagram of apparatus having the transfer characteristic represented by the coefficients tested in FIG. 22.

The synthesized system is shown in FIG. 23. The transfer characteristic of the no-storage two-poles are obtained directly from the graphs of FIG. 22. The graph of set 3 is the transfer characteristic of the two-pole associated with $u_1$. That is, $a_{111}$ is the coefficient of the first gate function $\phi_1(u_1)$, $a_{211}$ is the coefficient of $\phi_2(u_1)$ and $a_{311}$ is the coefficient of $\phi_3(u_1)$. Similarly, any graph in set 2 can be taken as the transfer characteristic associated with $u_2$. And finally, any graph in set 1 can be taken as the transfer characteristic associated with $u_3$. As discussed earlier, the vertical translation of these transfer characteristics is unimportant since it can be compensated for by a battery 110 in series with the system output as shown in FIG. 23. To find the value of the battery simply find the output of the system of FIG. 23 for any cell, say cell 1, 1, 1, and choose the battery so that this output is equal to that given by the $a$'s. That is, for cell 1, 1, 1 the system output (FIG. 23) without the battery is 2 volts (the scales for the transfer characteristics are assumed here to be in volts). But the system output for this cell should be equal to 1 volt since $a_{111}=1$. Hence a one volt battery is inserted with the proper polarity, in series with the output of the system in FIG. 23. Note that in any system of the form shown in FIG. 21 or FIG. 23 the battery can always be absorbed in the no-storage transfer characteristics by simply translating one or more of them vertically.

Figure 22:
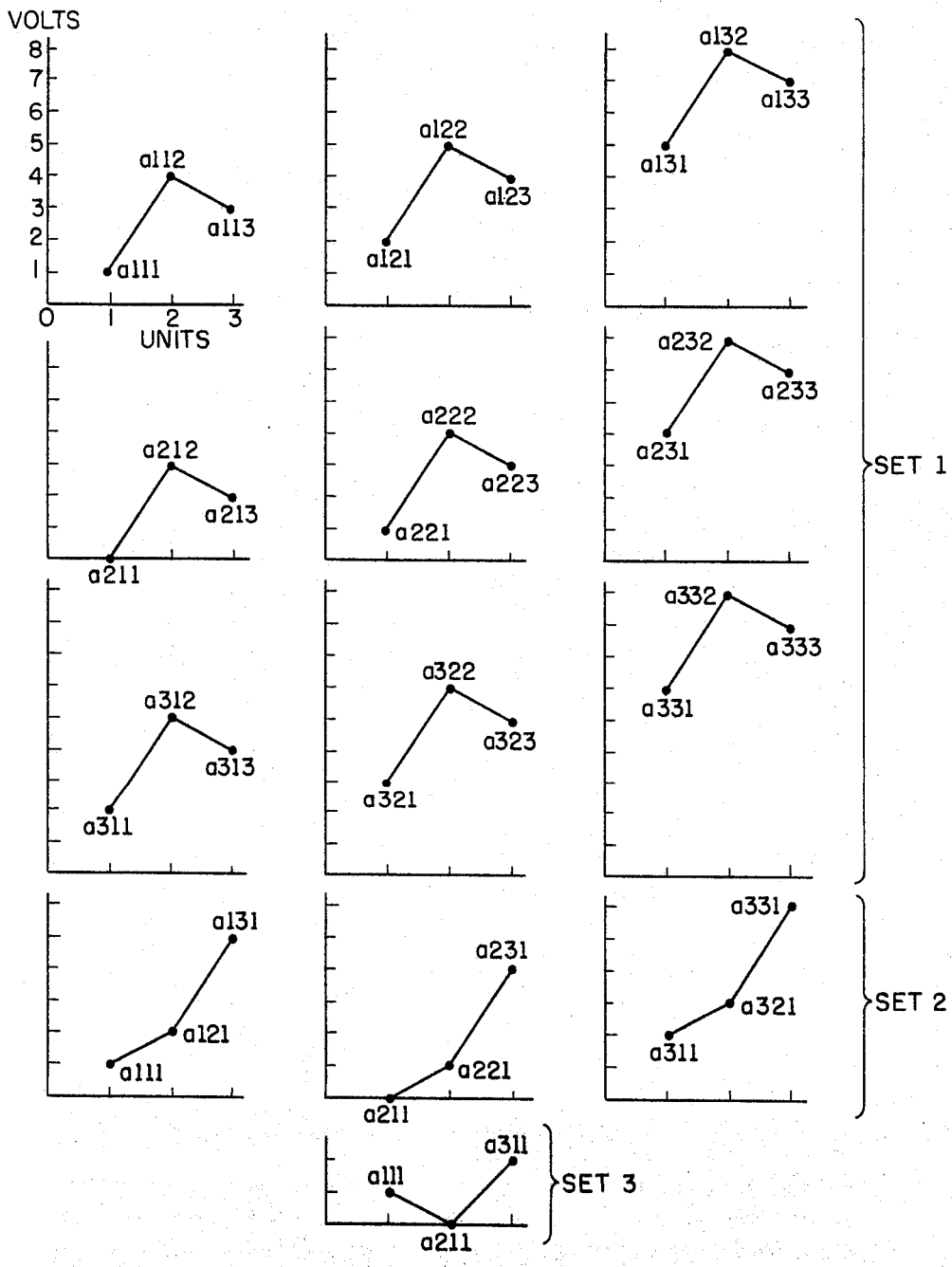
FIG. 22 is a graphical representation of a coefficient test for a specific example.

In FIG. 22 straight lines were arbitrarily drawn between the plots of the $a$'s. This amounts to forming a transfer characteristic by a linear interpolation between the coefficient that specify the characteristic, as shown by the solid lines in FIG. 23. However, as above, a gate function expansion yields a stepwise approximation to the transfer characteristic in which the height of each step is equal to the corresponding coefficient in the expansion. This step curve is shown by dotted lines in FIG. 23.

To illustrate another example, again consider a filter of the class $s=n=3$. Let the coefficients for this filter be:

| | | |
|---|---|---|
| $a_{111}=1$ | $a_{211}=0$ | $a_{311}=-1$ |
| $a_{112}=2$ | $a_{212}=1$ | $a_{312}=0$ |
| $a_{113}=3$ | $a_{213}=2$ | $a_{313}=1$ |
| $a_{121}=3$ | $a_{221}=2$ | $a_{321}=1$ |
| $a_{122}=4$ | $a_{222}=3$ | $a_{322}=2$ |
| $a_{123}=5$ | $a_{223}=4$ | $a_{323}=3$ |
| $a_{131}=5$ | $a_{231}=4$ | $a_{331}=3$ |
| $a_{132}=6$ | $a_{232}=5$ | $a_{332}=4$ |
| $a_{133}=7$ | $a_{233}=6$ | $a_{333}=5$ |

Figure 25:
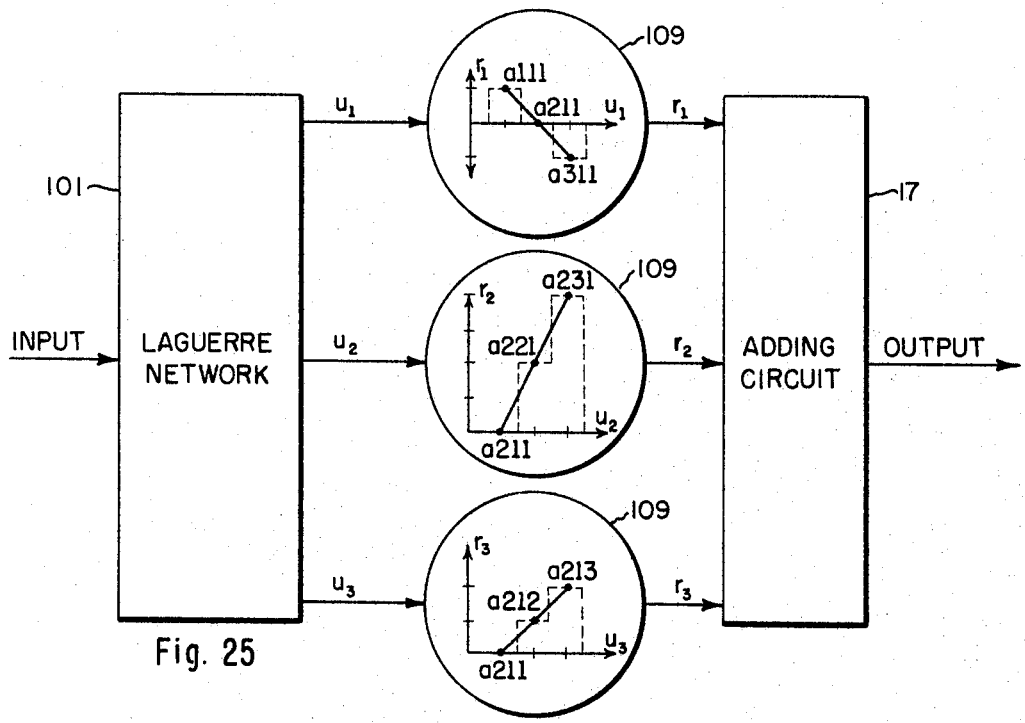
FIG. 25 is a block diagram of apparatus having the transfer characteristic represented by the coefficients tested in FIG. 24.

These coefficients, plotted according to the test procedure described above are shown in FIG. 24. It is seen that all the graphs within each set of graphs are identical within a vertical translation, and further, that they are all linear. Hence the system can be synthesized as shown in FIG. 25. The transfer characteristics of the no-storage two-poles are found directly from the graphs of FIG. 24 as discussed in the preceding example. The solid lines in the transfer characteristics of FIG. 25 indicate a linear interpolation between the coefficients that specify these characteristics. Since these solid line transfer characteristics are all linear they may be replaced by amplifiers whose gains are equal to the slope of the lines.

It was seen above that if the graphs of the characterizing coefficients (the $a$'s) of a system satisfy certain conditions the system can be synthesized in the relatively simple form shown in FIG. 21 and that under certain additional conditions the system is linear and the synthesis even simpler. In practical problems it is unlikely that the system coefficients will exactly satisfy these conditions. However, the relative simplicity of the systems of FIG. 21 makes it worthwhile to determine when a more complicated system can be approximated by one having this simple form.

The concept of approximating one system by another is meaningful only when a criterion is specified for the approximation and the degree of approximation specified relative to this criterion. The approximation of one system by another from the point of view of two different error criteria will now be considered.

First consider the weighted mean square error criterion defined by Eq. 27. Relative to this criterion it is to be determined how much error is introduced if the coefficients of the system are changed from their optimum values $A_\alpha$ to the values $A'_\alpha$.

According to Eq. 27, the error for a system whose coefficients are $A'_\alpha$ is given by $$\epsilon = \lim_{T\to\infty} \frac{1}{2T}\int_{-T}^{T} G(t)\left\{z(t)-\sum_\alpha A'_\alpha \Phi(\alpha)\right\}^2 dt \quad (49)$$

Expanding this equation $$\epsilon = \overline{z^2(t)G(t)} - \overline{2G(t)z(t)\sum_\alpha A'_\alpha \Phi(\alpha)}$$

$$+ \overline{G(t)\sum_\alpha\sum_\beta A'_\alpha A'_\beta \Phi(\alpha)\Phi(\beta)} \quad (50)$$

Taking advantage of the time domain orthogonality of the $\Phi(\alpha)$, Eq. 50 can be written $$\epsilon = \overline{z^2(t)G(t)} - 2\sum_\alpha A'_\alpha \overline{G(t)z(t)\Phi(\alpha)} + \sum_\alpha A'^2_\alpha \overline{G(t)\Phi(\alpha)} \quad (51)$$

in which $\Phi^2(\alpha)$ has been replaced by its equivalent, $\Phi(\alpha)$.

For the optimum filter coefficients $A_\alpha$, $\epsilon$ takes on its minimum value $\epsilon_{\min}$, given by Eq. 35 as follows $$\epsilon_{\min} = \overline{z^2(t)G(t)} - \sum_\alpha \frac{\overline{G(t)z(t)\Phi(\alpha)}^2}{\overline{G(t)\Phi(\alpha)}} \quad (35)$$

Using Eq. 31 for the optimum filter coefficients, Eq. 35 can be written $$\epsilon_{\min} = \overline{z^2(t)G(t)} - \sum_\alpha A_\alpha \overline{G(t)z(t)\Phi(\alpha)} \quad (52)$$

From Eqs. 51 and 52 there is obtained the relation $$\epsilon - \epsilon_{\min} = \sum_\alpha (A_\alpha - 2A'_\alpha)\overline{G(t)z(t)\Phi(\alpha)} + \sum_\alpha A'^2_\alpha \overline{G(t)\Phi(\alpha)} \quad (53)$$

Again using Eq. 31, Eq. 53 can be written $$\epsilon - \epsilon_{\min} = \sum_\alpha (A_\alpha^2 - 2A_\alpha A'_\alpha + A'^2_\alpha)\overline{G(t)\Phi(\alpha)} \quad (54)$$

which is equivalent to $$\epsilon - \epsilon_{\min} = \sum_\alpha (A_\alpha - A'_\alpha)^2 \overline{G(t)\Phi(\alpha)} \quad (55)$$

This equation is the desired expression for the error that is introduced when the system coefficients are changed from their optimum values $A_\alpha$ to the values $A'_\alpha$.

There are several interesting points to notice about Eq. 55 and the equations that lead to it. First, notice that $\epsilon-\epsilon_{\min}$ is always positive since $G(t)$ and $\Phi(\alpha)$ are non-negative functions. Thus, Eq. 55 shows that the optimum coefficients (the $A_\alpha$) determined by Eq. 31 actually render the error a minimum. Next, notice that as a consequence of the time domain orthogonality of the $\Phi(\alpha)$, each cell contributes independently to the expression for the system error (Eq. 51). This very convenient property of the gate function representation of a nonlinear system enables changes in any system coefficient to be independently and directly related to changes in the error $\epsilon$. From Eq. 55 it is seen that the increase in error due to a change in the $\beta$th coefficient from its optimum value $A_\beta$ to $A'_\beta$ is just $$\epsilon - \epsilon_{\min} = (A_\beta - A'_\beta)^2 \overline{G(t)\Phi(\alpha)} \quad (56)$$

But recall (FIG. 10) that $\overline{G(t)\Phi(\alpha)}$ is a quantity that is evaluated in determining the optimum system. Hence, if any coefficient is changed from its optimum value (as it may be for purposes of approximating a system by a simpler system), the corresponding increase in error may be immediately written down. Finally, notice the interesting fact that for $G(t)\equiv1$ (i.e., the mean square error criterion) the increase in error introduced by a given change in a coefficient is proportional to the probability that the corresponding cell in function space is occupied (recall that $\overline{\Phi(\alpha)}$ is equal to the probability that the $\alpha$th cell is occupied).

Another error criterion is now introduced and relative to it, the effect of changing the system coefficients is examined. As the criterion, an amplitude tolerance band T is specified for a system output and two systems are regarded as approximately equivalent if their outputs (for any input that is common to both systems) coincide within this tolerance band. T can be chosen to have a constant width for all amplitudes of the system output or its width can be chosen as a fuction of the amplitude of the system output (examples of these choices are illustrated later). Now recall that in the gate function representation of a nonlinear system the output of the system at an instant is equal to the value of the coefficient $A_\alpha$ that corresponds to the occupied cell in the function space. Hence, if the $\beta$th coefficient is changed from $A_\beta$ to $A'_\beta$, then the system output will change from $A_\beta$ to $A'_\beta$ when the $\beta$th cell is occupied. At all other times (i.e., when the $\beta$th cell is not occupied) the system output will be the same as that before the change was made. Notice that this result holds regardless of the system input. As a consequence of the simple relation between changes in the coefficients and changes in the amplitude of the system output, the tolerance band on the system output can be directly transferred to the coefficients. That is, for example, a two volt wide tolerance band is chosen about the output waveform, then any and all of the coefficients can be altered by as much as ±1 volt amplitude and the system output will remain within this tolerance band.

In the optimum filter problem (for the case $G(t) \equiv 1$) if any coefficient is altered from its optimum value $A_\beta$ to $A'_\beta$, in addition to knowing that the system output will change from $A_\beta$ to $A'_\beta$ when the $\beta$th cell is occupied, the probability of the occurrence of this error is known. This probability is just $\overline{\Phi(\beta)}$ which was measured in the process of determining $A_\beta$.

In summary, when any filter coefficient is changed from optimum value $A_\beta$ to $A'_\beta$, the following quantities may be immediately determined:

(1) The change in the weighted mean square error.
(2) The tolerance band relating the optimum and the altered systems.
(3) (For the case $G(t) \equiv 1$) the probability that the output of the altered system will differ from that of the original optimum system.

Conversely, if upper limits are specified on any of these quantities, the permissible variation in the $A_\alpha$'s may be found. In this respect it is most convenient to specify a tolerance band, for, as seen above, the same tolerance band can be applied to the system coefficients, thus directly determining their maximum permissible variation. Furthermore, of the three quantities listed above, the tolerance band is the only one whose specifications determines the permissible range of the $A_\alpha$'s independent of the system input. Hence, this criterion is truly charteristic of the system itself. (More precisely, it is characteristic of the gate function representation of the system.) Henceforth, when speaking of two systems as being nearly equivalent it is understood that this "equivalence" holds with respect to some suitably chosen tolerance band. To illustrate these concepts, consider an example of a nearly linear system.

Figure 26:
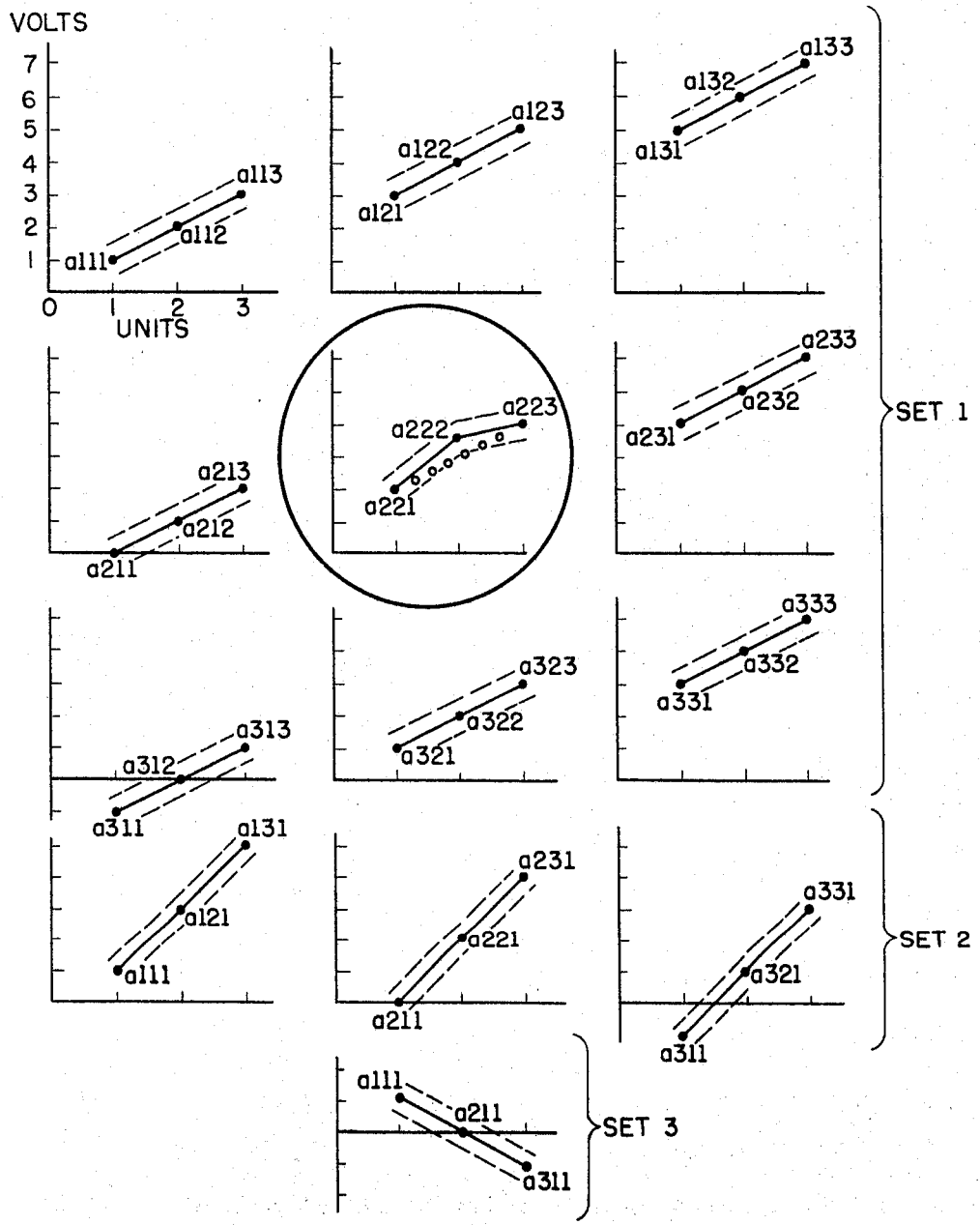
FIG. 26 is a graphical representation of coefficients of a nearly linear system.

Let the coefficients of an optimum mean square filter be the same as those of the example graphed in FIG. 24 with the one difference that $a_{222} = 3.5$ instead of 3.0. The graphs of these coefficients are shown in FIG. 26. It is recognized that these graphs do not satisfy the conditions for synthesis in the simple form of FIG. 21. However, establish a tolerance band of ±0.5 volt about the system output and see if there is a linear system that is nearly equivalent to this system. In FIG. 26 the dashed lines in each graph indicate the ±0.5 volt tolerance band. Inspection of this figure shows immediately that the system is nearly linear with respect to this tolerance band. All the graphs are linear except one (shown circled) and this one can be made linear, with the same slope as the other graphs of set 1, without exceeding the tolerance band, as shown by the dotted line. Hence this system is nearly equivalent to that graphed in FIG. 24 and can thus be approximated by the simple linear system of FIG. 25. Furthermore, by Eq. 56, the increase in the mean square error when this optimum system is approximated by the linear system is $$\epsilon - \epsilon_{\min} = (3.5 - 3.0)^2 \; \overline{\Phi(2, 2, 2)} \qquad (57)$$

where $\overline{\Phi(2, 2, 2)}$ is one of the measurements that was made in determining $a_{222}$. Finally, it is seen that the output of the linear system of FIG. 25 will differ from that of the optimum system only when the 2, 2, 2 cell is occupied and then this output will be 3.0 volts instead of 3.5 volts. The probability of this error is the known quantity $\overline{\Phi(2, 2, 2)}$.

In this simple example only one graph is nonlinear. However, the general procedure for finding a linear or simple nonlinear system of the class shown in FIG. 21 (if it exists) to approximate any system is clear. Tolerance limits are drawn on the graphs of the coefficients, and then it is seen if curves can be fit into these limits which satisfy the conditions of the class of systems of FIG. 21.

Figure 27:
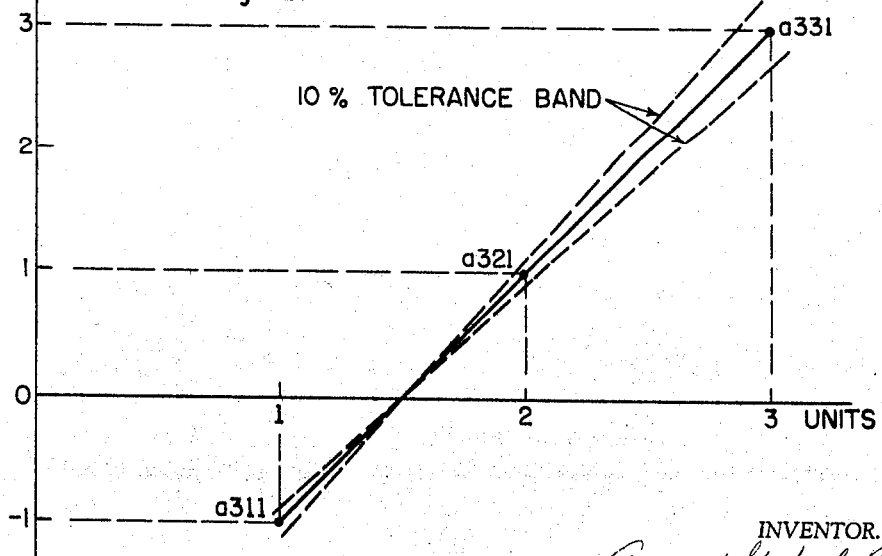
FIG. 27 is an example of a 10 percent tolerance band on a graph of system coefficients.

In the preceding example a tolerance band was chosen that had a constant width for all amplitudes of the signal output. In some applications it may be desirable to choose a band whose width is a function of the amplitude of the system output. For example suppose a band is chosen whose width is proportional to the system output. This corresponds to a percentage error criterion. That is, a system that approximates a given system with respect to this criterion has an output that is within a fixed percentage of the output of the given system at all times. An illustration of a 10 percent tolerance band applied to a graph of the coefficients is shown in FIG. 27.

The approximation of nonlinear filters by linear and simple nonlinear filters has been considered. The object of this approximation is to reduce the complexity of the filter. In many cases, for a given tolerance band, there exists no system of the form shown in FIG. 21 that approximates a given system. It may, however, still be possible to simplify the synthesis of this system by dividing it into two or more parts, each of which can be synthesized in a relatively simple form. The basis for the division of the system into separate parts is provided by the gate function representation of nonlinear systems given in Eq. 26. This representation lends itself conveniently to the decomposition of systems into parallel connected component systems. For any cell of the given system, the coefficient $A_\alpha$ is just the sum of the coefficients of the corresponding cell in each of the parallel connected component systems. Hence, a simple system can be extracted from a given system by subtracting the coefficients of the simple system from the corresponding coefficients of the given system. If the extraction simplifies the original system one complex system has been divided into two less complex parts. To illustrate this, consider the last example. Instead of approximating the system of this example by a linear one, synthesize it as the parallel combination of two simple systems. Note (FIG. 26) that, except for the coefficient $a_{2, 2, 2}$, all the graphs of the coefficients satisfy the conditions for a linear system. Subtract the set of coefficients corresponding to this linear system from the coefficients given in FIG. 26. The result is that all the coefficients of the remaining system are zero except the one corresponding to the 2, 2, 2 cell, which is 0.5. The coefficients of the extracted linear system are those of the example graphed in FIG. 24. Hence, the nonlinear system can be synthesized as the parallel combination of the linear system of FIG. 25 and a very simple nonlinear system having only one coefficient, $a_{2, 2, 2} = 0.5$. This approach of extracting simple systems to reduce the complexity of a system is effective only when, as in this example, the extraction causes many of the coefficients of the remaining system to be zero, thereby simplifying its synthesis.

It has been assumed throughout that the scale factor associated with the argument of the Laguerre functions is unity. By substituting $kx$ for $x$ in Eq. 1 the Laguerre functions having the scale factor $k$ are obtained. Unfortunately, there is no convenient analytical method for determining the optimum value of $k$ in the filter problem. Recall that the impulse response at the $n$th output terminal of the Laguerre network is $h_n(t)$, or $h_n(kt)$ with the scale factor $k$. It is seen that $k$ effects a time scaling of the impulse response of the Laguerre network and hence a frequency scaling of the transfer function of this network. In determining optimum filters by the methods described, use can be made of knowledge of the frequency band of $x(t)$ to judiciously choose $k$. It would be convenient however to have a method for obtaining the optimum $k$ rather than just a good guess for it. An experimental procedure for accomplishing this result is now described.

Consider the effect of changing the time scale of $x(t)$ and $z(t)$ in the experimental procedure for determining optimum filters. That is, consider that these time functions are replaced by $x(t/k)$ and $z(t/k)$ respectively. In the laboratory this could be achieved by recording the ensemble members of $x(t)$ and $z(t)$ and then playing the recording back at a speed of $1/k$ times the recording speed. First, consider the effect of this time scaling on the determination of no-storage filters in the form of FIG. 2. It is clear that since the apparatus for determining the filters has no memory, its operation is independent of the time scaling indicated above. That is, the same filter will be determined regardless of the value of $k$. Now consider the procedure (FIG. 10) for determining optimum filters involving memory. Notice that the only portion of the apparatus that involves memory is the Laguerre network. As a consequence if $x(t)$ and $z(t)$ are replaced by $x(t/k)$ and $z(t/k)$ respectively, the same filter is obtained as if $x(t)$ and $z(t)$ had been used but the scale factor of the Laguerre network was changed from unity to $k$. Now recall that apparatus can be constructed which indicates the minimum error for the optimum filter (of the class of filters having a given Laguerre network and $\Phi$ generator). This apparatus, like that of FIG. 10, consists of no-memory circuits and a Laguerre network. By varying the speed of the recordings of $x(t)$ and $z(t)$ that are fed into this apparatus and observing its output ($E_{min}$ of Eq. 35) the optimum $k$ can be directly determined. In practice the Laguerre network in the minimum error detecting apparatus is built to have a scale factor corresponding to a judicious guess of the optimum $k$. Then the speeds of the recordings of $x(t)$ and $z(t)$ are varied in order to explore scale factors in the neighborhood of the guess. It should be noted that in general the amplitude of the signals at the outputs of the Laguerre network will change with the change in speed of the recordings of $x(t)$. The maximum amplitude of these signals must be kept at a constant level corresponding to the range $a$–$b$ (Eq. 13) over which the gate functions are defined. If desired, circuitry can be constructed to accomplish this adjustment automatically.

For the discussions above, it was convenient to characterize the past of the filter input by Laguerre functions since they form a complete set of functions on this past. In practice, however, only a small number of Laguerre functions are used and hence the fact that they form a complete set is no longer of prime importance. The important question in the practical case is, "Do a small number of functions of the past suffice?"

In many filter problems involving the separation of signals from noise the immediate past of the filter input contains more information about the present value of the desired signal than does the more remote past. Since the Laguerre functions decay exponentially (Eq. 1), they weight the immediate past of the input considerably more than the more remote past, and hence they will form a convenient set of functions for use in many filter problems.

For some applications it may be convenient to derive the functions of the past from taps on a delay line rather than from a Laguerre network (even though the outputs of a delay line do not form a complete set of functions on the past of the input). For example, suppose the input signal includes messages in which consecutive symbols are coded in a sequence of pulses of different amplitudes. Then it would be appropriate to replace thte Laguerre network by a delay line with taps so spaced that consecutive pulses appear at adjacent taps. Then at any instant the $s$ outputs of the delay line would specify the amplitudes of the $s$ preceding pulses. Another example for which it is appropriate to replace the Laguerre network by a delay line is the problem of detecting the presence of a train of pulses that are equally spaced in time. If the delay between the taps is equal to the time interval between the pulses then when the train of pulses is present it will affect all outputs of the delay line simultaneously. These are examples in which it is desirable to give equal weight to different portions of a finite interval of the past and hence a delay line is more appropriate than a Laguerre network.

It is clear that many choices may be made for the functions that characterize the past of the filter input. Each choice implies a restriction to a class of filters from which the experimental procedure, similar to that utilizing the apparatus of FIG. 10, will pick the optimum for the particular problem. Use may be made of the apparatus that determines the minimum error for a given class of filters in order to decide whether to use a Laguerre network or a delay line etc. in a given problem. The different networks are inserted into this apparatus in place of the Laguerre network, and the one which yields the smallest error is chosen.

The choice of the number of gate functions will now be discussed. By increasing the number of gate functions associated with each Laguerre coefficient, the function space of the input is quantized into smaller cells. While in general this is desirable from the point of view of reducing the filtering error, it leads to a very large number of coefficients to evaluate. When possible, it is desirable to make use of any information about the particular filter problem that will enable the number of gate functions to be reduced. For example, consider the problem of pure (noiseless) prediction of a stationary time function consisting of equally spaced pulses having amplitudes of zero or unity with a certain probability distribution. As discussed above it is appropriate, for a problem of this type, to replace the Laguerre network by a delay line. The output from each tap on the delay line will then take on only the values zero and unity. Hence, only two gate functions are needed for each output of the delay line.

It was also mentioned above that in many filter problems the immediate past of the input contains more information about the present value of the desired output than does the more remote past. A study of the Laguerre functions shows that the higher order functions weight the remote past more strongly than do the lower order functions. Hence, for purposes of filtering, it is expected that it might not be as important to distinguish small changes in the amplitude of the higher order Laguerre coefficients as in the lower order ones (or, in the case of delay lines it might not be as important to distinguish small changes in those outputs that represent samples of the more remote past). Thus, a smaller number of gate functions might be chosen for the higher order Laguerre coefficients than for the lower order ones.

In summary, the choices of the scale factor, the functions that characterize the past of the input, and the number of gate functions, are all choices that determine the class of filters, from which the procedure similar to that employing the apparatus of FIG. 10 determines the optimum filter. Any information about the particular filter problem that will enable the class of filters to be judiciously chosen so that the number of coefficients is reasonable in the light of the task that the filter is to perform is preferably utilized.

The specific apparatus described herein is only to illustrate specific embodiments of the invention. For example, those skilled in the art may practice the invention by utilizing level selecting means different from the level selector tube specifically described and means other than Laguerre networks for storing the past of an input signal. Thus, numerous modifications of and departures from the specific embodiments and methods described herein may be practiced by those skilled in the art without departing from the inventive concepts. Consequently, the invention is to be construed as limited only by the spirit and scope of the appended claims.

What is claimed is:

1. Apparatus for processing an input signal having values of a selected physical characteristic which lie within a predetermined region of said selected physical characteristic, said region being dividable into a plurality of adjacent mutually exclusive incremental regions, said signal being characterized by a single-valued function of said physical characteristic with respect to time comprising, a source of said input signal, means responsive to said input signal associated with each incremental region for providing an output signal having a first value only when the contemporary value of said input signal selected characteristic lies within the associated incremental region, said output signal having a different value at all other times, a signal processing circuit associated with each of said means and providing a processed output signal only when the output signal from the associated means assumes said first value, and an averaging circuit coupled to said signal processing circuit for providing an output signal representative of the average value of said processed output signal.

2. Apparatus for processing an input signal whose amplitude may assume values within a continuous region dividable into a plurality of adjacent mutually exclusive incremental regions, comprising, means associated with each incremental region for providing an output signal having a first value only when the contemporary value of said input signal amplitude lies within the associated incremental region, said output signal having a different value at all other times, a signal processing circuit associated with each of said means and providing a processed output signal only when the output signal from the associated means assumes said first value, and an averaging circuit coupled to said signal processing circuit for providing an output signal representative of the average value of said processed output signal.

3. Signal processing apparatus comprising, a source of an electron beam, means for directing said electron beam through beam deflecting means toward one of a plurality of adjacent consecutively arranged target electrodes selected in accordance with the contemporary amplitude of an input signal applied to said deflecting means, a signal from the selected target electrode uniquely identifying that one of a plurality of corresponding consecutive substantially contiguous amplitude regions then including said contemporary amplitude, and respective output circuits connected to each target electrode, each including means for providing an output signal proportional to the ratio of the time duration said electron beam energized the associated electrode to the time duration said electron beam did not energize the associated electrode.

4. Signal translation apparatus comprising, means responsive to an input signal for providing an output signal when the contemporary value of a characteristic of said input signal lies within a selected region, signal generating means for providing a weighting signal having a predetermined value different from that of said input signal means responsive to said output signal and said weighting signal related to a predetermined weighting function for providing a signal related to the product of the latter two signals, means for providing a signal related to the average value of the product signal thus derived, means for multiplying said product signal with another input signal to derive another product signal, and averaging means for deriving a signal related to the average value of the latter product signal.

5. Signal translation apparatus comprising, a level selector circuit energized by an input signal, a gate circuit energized by a signal related to a predetermined weighting function and the output signal from said level selector circuit to provide a weighted output signal, an averaging circuit energized by said weighted output signal, and a product averaging circuit energized by said weighted output signal and a second input signal.

6. Signal translation apparatus comprising, a source of an input signal, said input signal being characterized by a physical characteristic that is a single-valued function of time, a plurality of selective means each responsive to said input signal for providing an output signal only when the contemporary value of said physical characteristic of said input signal lies within a selected region related to the respective means, said regions being mutually exclusive, means associated with each of said plurality of selective means for imparting a selected gain to the output signal from the associated selective means, and means for cumulatively combining the output signals with the selected gains imparted thereto.

7. Signal translation apparatus comprising, means for storing a characteristic of an input signal for at least one preceding time interval, means for sensing the value of each stored characteristic simultaneously with sensing the contemporary value of said characteristic, means for providing an output signal uniquely characteristic of the combination of values then sensed, means responsive to said output signal and a signal related to a predetermined weighting function to provide a signal related to the product of the latter two signals, means for providing a signal related to the average value of the product signal thus derived, means for multiplying said product signal with another input signal to derive another product signal, and means for deriving a signal related to the average value of the latter product signal.

8. Apparatus for determining a filter which selectively provides a desired signal in response to an input signal which includes desired and undesired signal components comprising, means responsive to said input signal for providing an output signal when the contemporary value of a characteristic of said input signal lies within a selected region, signal generating means for providing a weighting signal having a predetermined value different from that of said input signal, means responsive to said output signal and said weighting signal related to a predetermined weighting function for providing a signal related to the product of the latter two signals, means for providing a signal related to the average value of the product signal thus derived, means for multiplying said product signal with said desired signal to derive another product signal, and averaging means for deriving a signal related to the average value of the latter product signal, the ratio of said average values determining a characterizing coefficient of said filter which is related to said selected region.

9. Signal translation apparatus comprising, means for storing a characteristic of an input signal for at least one preceding time interval, means for sensing the value of each stored characteristic simultaneously with sensing the contemporary value of said characteristic, respective means associated with each stored characteristic sensing means and the contemporary value sensing means for providing an output signal when the value then sensed lies within a selected region, gating means for combining the output signals thus derived to provide a gate function signal uniquely characteristic of the combination of values then sensed, means for multiplying said gate function signal with a signal related to a predetermined weighting function to derive a product signal, means for deriving a signal related to the average value of said product signal, means for multiplying said product signal with another input signal to derive another product signal, and means for deriving a signal related to the average value of the latter product signal.

10. Signal translation apparatus comprising, means for examining predetermined input signal portions to sense the values of a selected characteristic, means for providing an output signal uniquely characteristic of the combination of values then sensed; respective gating means associated with each of a plurality of unique combinations of values which may be sensed, each of said gating means activated by the output signal derived when its associated unique combination of values is sensed whereby a gated output signal is provided, means for multiplicatively combining said gated output signal with a second signal to derive a product signal, and means for determining the ratio of the average values of said product and gated output signals.

11. Signal translation apparatus comprising, means for examining predetermined input signal portions to sense the values of a selected characteristic, means for providing an output signal uniquely characteristic of the combination of values then sensed; respective gating means associated with each of a plurality of mutually exclusive unique combinations which may be sensed, each of said gating means activated by the output signal derived only when its associated unique combination of values is sensed whereby a gated output signal is provided; means associated with each gating means for imparting a selected gain to the respective gated output signal, and means for cumulatively combining the gated output signals with the selected gains imparted thereto.

12. A method of signal translation including the steps of sensing an input signal characteristic whose instantaneous value is a single-valued function of time, selecting that one of a plurality of mutually exclusive adjacent incremental regions which then includes said instantaneous value, each of said regions being associated with a distinct gate function, providing respective independent gate function output signals only when the associated one of said incremental regions then includes said instantaneous value, and determining the average value of each of said gate function output signals.

13. A method in accordance with claim 12 and further including the steps of providing respective first averaged signals related to the average values of said gate function output signals, and providing respective second averaged signals related to the average values of respective products of said gate function signals with a second input signal.

14. A method of signal translation including the steps of sensing an input signal characteristic whose instantaneous value is a single valued function of time, selecting that one of a plurality of mutually exclusive adjacent incremental regions which then includes said instantaneous value, each of said incremental regions being associated with a distinct gate function, and continuously providing an indication of the incremental region including the contemporary value of said characteristic by providing the respective independent gate function output signals corresponding to said contemporary value in the associated region, said independent gate function output signals occurring during mutually exclusive time intervals.

15. Apparatus for processing an input signal having a characteristic whose instantaneous value is a single-valued function of time comprising, means responsive to said input signal for providing an output signal only when said instantaneous value is then within a first continuous range of values, means to cause said instantaneous value to be within said first continuous range of values at non-predetermined non-fixed time intervals, an averaging circuit, and means for coupling said output signal to said averaging circuit.

16. Apparatus for processing an input signal having a characteristic whose instantaneous value is a single-valued function of time comprising, means responsive to said input signal for providing an output signal only when said instantaneous value is then within a first continuous range of values, a first averaging circuit, means for coupling said output signal to said first averaging circuit, a source of a second signal, a multiplier, means for coupling said output signal and said second signal to said amplifier to provide a product signal, a second averaging circuit and means for coupling said product signal to said second averaging circuit.

17. Apparatus for determining the transfer characteristics of a system for responding to an input signal with a desired output signal, said input signal having a characteristic whose instantaneous value is a single-valued function of time, comprising, a source of first and second signals which are corresponding ensemble members of said input and desired output signals, respectively, means responsive to said first signal for providing a first gate function signal only when said instantaneous value is then within a first continuous range of values, a first averaging circuit, means for coupling said first gate function signal to said first averaging circuit, a multiplier, means for coupling said first gate function signal and said second signal to said multiplier to provide a product signal, a second averaging circuit, and means for coupling said product signal to said second averaging circuit, the ratio of the outputs of said first and second averaging circuits being a constant characterizing the response of said system to said input signal when the value of said input signal is within said first range.

18. Apparatus for determining the transfer characteristics of a system for responding to an input signal with a desired output signal, said input signal having a characteristic whose instantaneous value is a single-valued function of time, comprising, a source of first and second signals which are corresponding ensemble members of said input and desired output signals, respectively, respective value sensing means each associated with respective mutually exclusive substantially contiguous incremental continuous ranges of said value for providing respective gate function signals only when the instantaneous value of said first signal is within the respective range, means for coupling said first signal to said value sensing means to provide respective gate function signals corresponding to and contemporaneous with said first signal instantaneous values, first averaging means for providing respective first averaged output signals related to the average values of the respective gate function signals, means for coupling said gate function signals to said first averaging means to provide respective first averaged output signals, multiplying means for providing respective gate function product signals related to the product of the respective gate function signals with said second signal, means for coupling said gate function signals and said second signal to said multiplying means to provide respective gate function product signals, second averaging means for providing respective second averaged output signals related to the average values of the respective gate function product signals, and means for coupling said gate function product signals to said second averaging means to provide respective second averaged output signals, the ratio of a second averaged output signal to a first averaged output signal related to the same gate function signal being a constant characterizing the response of said system to said input signal when the value of said input signal characteristic is within the range associated with the respective gate function signal.

19. Apparatus for processing a plurality of input signals each having a physical characteristic whose instantaneous value is a single valued function of time, comprising, a source of said plurality of input signals, respective value sensing means for each input signal responsive to a respective input signal, each of said value sensing means comprising respective range value sensing means each associated with respective mutually exclusive substantially contiguous incremental continuous ranges of said value for providing respective range value signals only when the instantaneous value of the associated input signal physical characteristic is within the respective range, and means responsive to the range value signals of said value sensing means for providing a first gate function signal only when a first unique combination of instantaneous values of the respective physical characteristics of said input signals is then sensed.

20. Apparatus in accordance with claim 19 and further comprising, an averaging circuit, and means for coupling said first gate function signal to said averaging circuit.

21. Apparatus in accordance with claim 20 and further comprising, a source of a second signal, multiplying means, means for coupling said first gate function signal and said second signal to said multiplying means to provide a product signal related to the product of said first gate function signal with said second signal, a product averaging circuit, and means for coupling said product signal to said product averaging circuit.

22. Apparatus for processing a plurality of input signals each having a characteristic whose instantaneous value is a single valued function of time, comprising, respective value sensing means for each input signal, each of said value sensing means comprising respective range value sensing means each associated with respective mutually exclusive substantially contiguous incremental continuous ranges of said value for providing respective range value signals only when the instantaneous value of the associated input signal is within the respective range, respective means responsive to the range value signals of said value, sensing means for providing respective gate function signals corresponding to and contemporaneous with respective unique combinations of instantaneous values of the respective characteristics of said input signals then being sensed, first averaging means, means for coupling said gate function signals to said first averaging means to provide respective first averaged output signals related to the average values of the respective gate function signals, a source of a second signal, multiplying means, means for coupling said gate function signals and said second signal to said multiplying means to provide respective gate function product signals related to the product of the respective gate function signals with said second signal, second averaging means, and means for coupling said gate function product signals to said second averaging means to provide respective second averaged output signals related to the average values of the respective gate function product signals.

23. Apparatus in accordance with claim 22 wherein said input signals are respective ensemble members of a set of information signals, said second signal is the desired output signal of a system in response to said set of input signals, and the ratio of a second averaged output signal to a first averaged output signal related to the same gate function signal is a constant characterizing the response of said system to said set of input signals when the instantaneous values of the respective characteristics thereof represent the unique combination associated with the respective gate function signal.

24. Signal translation apparatus comprising, a level selector circuit energized by an input signal, an averaging circuit, a product averaging circuit, means for coupling the output of said level selector circuit to said averaging circuit and said product averaging circuit, and a source of a second input signal coupled to said product averaging circuit.

25. Signal translation apparatus comprising, means for sensing the values of an input signal characteristic at different times, means for providing an output signal uniquely characteristic of the combination of values then sensed, means for providing an averaged output signal related to the average value of said output signal, means for multiplying a second input signal with a signal related to said output signal to provide a product signal, and means for providing a product average signal related to the average value of said product signal.

26. Signal translation apparatus comprising, a storage network energized by an input signal and having a plurality of terminals, each of said terminals providing a signal related to the value of said input signal at different times, respective level selectors coupled to said terminals for providing range value signals indicative of the signal value then on the respective terminal, and gate circuits activated by said level selectors during mutually exclusive time intervals to provide respective gate function signals indicative of the presence of a predetermined combination of signal values then on said terminals.

27. Apparatus in accordance with claim 26 wherein said storage network is a Laguerre network.

28. Apparatus for determining the transfer characteristic of a nonlinear system according to a maximum probability criterion comprising a source of an input signal consisting of a desired signal component and an undesired signal component, a source of an output signal desired in response to said input signal, means responsive to said input signal for providing a gate function signal, means responsive to said output signal desired in response to said input signal for providing respective range value signals indicative of that one of a plurality of mutually exclusive substantially contiguous incremental continuous ranges of values a characteristic of said desired output then assumes, and a plurality of gate circuits respectively energized by said range value signals and jointly energized by said gate function signal, each gate circuit providing a gated output signal only when simultaneously energized by its respective range value signal and said gate function signal, means for averaging each of said gated output signals, and means for comparing the amplitudes of the averaged gated output signals.

29. Apparatus for determining the transfer characteristic of a system for improving the response of a given system comprising, a storage network energized by an input signal and having a plurality of terminals, each of said terminals providing a signal related to the value of said input signal at different times, said given system being simultaneously energized with said input signal, respective level selectors coupled to said terminals and the output of said given system for providing range value signals indicative of the respective signal values then sensed, and respective gate circuits activated during mtually exclusive time intervals to provide respective gate function signals indicative of the presence of a predetermined unique combination of signal values then sensed.

30. Apparatus in accordance with claim 29 and further comprising, first averaging means, means for coupling said gate function signals to said first averaging means to provide respective first averaged output signals related to the average values of the respective gate function signals, a source of the output signal desired in response to said input signal, multiplying means, means for coupling said gate function signals and said desired output signal to said multiplying means to provide respective gate function product signals related to the product of the respective gate function signals with said desired output signal, second averaging means, and means for coupling said gate function product signals to said second averaging means to provide respective second averaged output signals related to the average values of said gate function product signals, the ratio of a second averaged output signal to a first averaged output signal related to the same gate function signal characterizing the response of said system for improving said given system to an input signal causing signal values on said terminals and said given system output to then be the unique combination associated with the respective gate function signal.

31. Apparatus for determining the transfer characteristic of a system for improving the response of a given system comprising, a storage network energized by an input signal and having a plurality of terminals, each of said terminals providing a signal related to the value of said input signal at different times, said given system being simultaneously energized with said input signal, respective level selectors coupled to said terminals for providing range value signals indicative of the respective signal values then sensed, respective gate circuits activated during mutually exclusive time intervals to provide respective gate function signals indicative of the presence of a predetermined unique combination of signal values then sensed, first averaging means, means for coupling said gate function signals to said first averaging means to provide respective first averaged output signals related to the average values of the respective gate function signals, a source of the output signal desired in response to said input signal, means for differentially combining said output signal with the output of said given system to provide a difference signal, multiplying means, means for coupling said gate function signals and said difference signal to said multiplying means to provide respective gate function product signals related to the product of the respective gate function signals with said difference signal, second averaging means, and means for coupling said gate function product signals to said second averaging means to provide respective second averaged output signals related to the average values of said gate function product signals, the ratio of a second averaged output signal to a first averaged output signal related to the same gate function signal characterizing the response of said system for improving said given system to an input signal causing signal values on said terminals to then be the unique combination associated with the respective gate function signal.

32. Signal translation apparatus comprising, respective means associated with each of a plurality of input signals for sensing the values of a respective input signal characteristic at different times, means for providing an output signal uniquely characteristic of the combination of values then sensed, means for providing an averaged output signal related to the average value of said output signal, means for multiplying a second input signal with a signal related to said output signal to provide a product signal, and means for providing a product average signal related to the average value of said product signal.

33. A method of determining the minimum error of a nonlinear system in responding to an input signal with a desired output signal, said system having a Laguerre network characterized by a prescribed number of Laguerre coefficients, said method including the steps of sensing the value of said input signal corresponding to the respective Laguerre coefficients and providing gate function signals indicative of unique combinations of said values then sensed, providing respective first averaged output signals related to the average values of the respective gate function signals, providing respective product signals related to the product of said gate function signals with said desired output signal, averaging said product signals, and squaring the averaged product signals to derive respective squared averaged product signals.

34. The method in accordance with claim 33 and further including the step of providing a signal related to the average value of the square of said desired output signal.

35. The method in accordance with claim 33 and further including the step of varying the rate at which said values are sensed, and noting when the ratio of a squared averaged product signal to a corresponding first averaged output signal is a maximum, the rate at this time being indicative of the optimum scale factor $K$ for said Laguerre network.

36. Apparatus for providing an output signal functionally related to the amplitude of an input signal comprising, a source of an electron beam, means for directing said electron beam through beam deflecting means toward one of a plurality of adjacent consecutively-arranged target electrodes selected in accordance with the contemporary amplitude of said input signal applied to said deflecting means, a signal from the selected target electrode uniquely identifying that one of a plurality of corresponding consecutive substantially contiguous amplitude regions then including said contemporary amplitude, common and output terminals, an output impedance connected between said common terminal and said output terminal, and separate signal leads between each target electrode and respective predetermined points of said output impedance for carrying signal currents between said common terminal and the respective target electrodes through corresponding predetermined portions of said output impedance to provide said output signal on said output terminal.

37. Signal processing apparatus comprising, a source of an electron beam, means for directing said electron beam through beam deflecting means toward a target electrode only when the contemporary amplitude of an input signal applied to said deflecting means is within a selected incremental continuous amplitude region, means to cause said contemporary amplitude to be within said selected incremental continuous amplitude region at non-predetermined non-fixed time intervals, an integrating circuit, and a signal lead coupling said target electrode to said integrating circuit and carrying signal currents only when said input signal amplitude is within said selected region.

38. Apparatus in accordance with claim 37 and further comprising, means for applying a biasing signal to said deflecting means to determine said selected amplitude region.

39. A method of signal translation including the steps of sensing an input signal characteristic whose instantaneous value is a single-valued function of time, selecting that one of a plurality of mutually exclusive adjacent incremental regions which then include said instantaneous value, each of said regions being associated with a distinct gate function, providing respective independent gate function output signals only when the associated one of said incremental regions then includes said instantaneous value, providing respective first averaged signals related to the average values of said gate function output signals, providing respective second averaged signals related to the average values of respective products of said gate function signals with a second input signal, the ratio of a first averaged signal to a second averaged signal associated with the same gate function signal determining a coefficient associated with that one of said incremental regions related to the latter gate function signal, and applying a signal having the same statistical characteristics as said input signal to a system having a transfer characteristic determined by said coefficients to provide an output signal.

40. Signal translation apparatus comprising, a source of first and second signals which are corresponding ensemble members of input and desired output signals respectively, said input signal having a characteristic whose instantaneous value is a single-valued function of time, respective value sensing means each associated with respective mutually exclusive substantially contiguous incremental continuous ranges of said value for providing respective gate function signals only when the instantaneous value of said first signal is within the respective range, means for coupling said first signal to said value sensing means to provide respective gate function signals corresponding to and contemporaneous with said first signal instantaneous values, first averaging means for providing respective first averaged output signals related to the average values of the respective gate function signals, means for coupling said gate function signals to said first averaging means to provide respective first averaged output signals, multiplying means for providing respective gate function product signals related to the product of the respective gate function signals with said second signal, means for coupling said gate function signals and said second signal to said multiplying means to provide respective gate function product signals, second averaging means for providing respective second averaged output signals related to the average values of the respective gate function product signals, means for coupling said gate function product signals to said second averaging means to provide respective second averaged output signals, a system having an input and an output, said system comprising means for generating a plurality of third signals, each of said plurality of third signals being proportional to the ratio of a second averaged output signal to a first averaged output signal, means responsive to said third signals for generating a plurality of coefficient indications, said system having a transfer characteristic characterized by said coefficient indications, each coefficient characterising the response of said system to an input signal applied thereto when the value of said input signal characteristic is within the range associated with the respective gate function signal, and means for applying a first signal ensemble member to said system input to provide said desired output signal.

41. Apparatus for processing an input signal whose amplitude may assume values within a continuous region divideable into a plurality of adjacent mutually exclusive incremental regions, comprising, means associated with each incremental region for providing an output signal having a first value only when the contemporary value of said input signal amplitude lies within the associated incremental region, said output signal having a different value at all other times, respective signal processing circuits associated with each of said means and providing a processed output signal only when the output signal from the associated means assumes said first value, means for combining each processed output signal with at least one other signal, and averaging means coupled to said combining means for providing signals related to the average value of each signal provided by the latter combining means.

42. Signal translation apparatus comprising, a source of first and second signals which are corresponding ensemble members of input and desired output signals respectively, said input signal having a characteristic whose instantaneous value is a single-valued function of time, a first level selector tube having an electron beam and a plurality of adjacent target strips each associated with respective mutually exclusive substantially contiguous incremental continuous ranges of said value, means for deflecting said electron beam, means for coupling said first signal to said deflecting means to cause said electron beam to impinge upon that one of said target strips associated with the range of values then including the contemporary value of said characteristic of said first signal, control means for determining the electron beam current, averaging circuits respectively connected to each target strip, selective means for applying a first control signal to said control means to maintain said electron beam current substantially constant while said first signal is coupled to said deflection means during a first time interval and for coupling said second signal to said control means to vary said current in accordance with said second signal while said first signal is applied to said deflection means during a second interval whereby the ratio of the output signal provided by each averaging circuit during said second time interval to such output signal provided during said first time interval identifies a gain coefficient associated with a respective target strip, a second level selector tube similar to said first tube having an electron beam and a like plurality of target strips, an output terminal, gain control means for coupling each target strip to said output terminal, the ratio of the gains imparted by the latter means to each target strip output signal corresponding to the ratio of said gain coefficients associated with corresponding first tube target strips, means for maintaining said second tube electron beam current substantially constant, means for deflecting said second tube electron beam, and means for applying a first signal ensemble member to said second tube deflecting means to provide said desired output signal on said output terminal.

References Cited by the Examiner

UNITED STATES PATENTS

| | | | |
|---|---|---|---|
| 2,195,098 | 3/1940 | Skellet | 313—73 X |
| 2,266,671 | 12/1941 | Wolf | 313—73 X |
| 2,505,029 | 4/1950 | Carbrey | 250—27 |
| 2,549,422 | 4/1951 | Carbrey | 250—27 |
| 2,640,965 | 6/1953 | Eaglesfield | 179—15 |
| 2,646,465 | 7/1953 | Davis et al. | 179—16 |
| 2,704,936 | 3/1955 | Vine et al. | 235—61 |
| 2,714,704 | 8/1955 | Morrison | 332—11 |
| 2,738,463 | 3/1956 | Metzger | 332—1 |
| 2,787,764 | 4/1957 | Bjorkman | 332—13 |
| 2,801,351 | 7/1957 | Calvert | 235—181 X |
| 2,840,308 | 6/1958 | Van Horne | 235—181 |
| 2,912,164 | 11/1959 | Seevers | 235—181 X |
| 2,925,220 | 2/1960 | Serrell | 235—197 |
| 3,038,069 | 6/1962 | Tuller | 235—181 X |

MALCOLM A. MORRISON, *Primary Examiner.*

J. YAFFEE, L. SMILOW, WALTER W. BURNS, JR., D. W. COOK, *Examiners.*

K. CLAFFY, J. M. FINKELSTEIN, K. W. DOBYNS, *Assistant Examiners.*